(12) United States Patent
Reyes

(10) Patent No.: US 9,720,258 B2
(45) Date of Patent: Aug. 1, 2017

(54) ELECTRONIC ORNAMENTATION FOR EYEWEAR

(71) Applicant: Oakley, Inc., Foothill Ranch, CA (US)

(72) Inventor: Carlos D. Reyes, Rancho Santa Margarita, CA (US)

(73) Assignee: Oakley, Inc., Foothill Ranch, CA (US)

( * ) Notice: Subject to any disclaimer, the term of this patent is extended or adjusted under 35 U.S.C. 154(b) by 112 days.

(21) Appl. No.: 14/850,691

(22) Filed: Sep. 10, 2015

(65) Prior Publication Data

US 2016/0004103 A1 Jan. 7, 2016

Related U.S. Application Data

(63) Continuation of application No. PCT/US2014/019989, filed on Mar. 3, 2014.

(60) Provisional application No. 61/794,727, filed on Mar. 15, 2013.

(51) Int. Cl.
| | |
|---|---|
| *G02C 1/00* | (2006.01) |
| *G02C 11/00* | (2006.01) |
| *H04N 7/04* | (2006.01) |
| *G09F 9/30* | (2006.01) |
| *G06F 3/01* | (2006.01) |
| *G02C 11/02* | (2006.01) |
| *G02C 5/14* | (2006.01) |
| *G02F 1/1333* | (2006.01) |
| *G02B 27/01* | (2006.01) |

(52) U.S. Cl.
CPC .............. *G02C 11/10* (2013.01); *G02C 5/14* (2013.01); *G02C 11/02* (2013.01); *G06F 3/01* (2013.01); *G09F 9/30* (2013.01); *H04N 7/04* (2013.01); *G02B 2027/0178* (2013.01); *G02F 1/133308* (2013.01)

(58) Field of Classification Search
CPC ............ G02C 11/10; G02C 11/02; G02C 1/00
USPC ............................ 351/51, 52, 111, 121, 158
See application file for complete search history.

(56) References Cited

U.S. PATENT DOCUMENTS

| | | | |
|---|---|---|---|
| 1,026,272 | A | 5/1912 | Leveque |
| 1,370,806 | A | 3/1921 | Garner |
| 2,237,567 | A | 4/1941 | Land |

(Continued)

FOREIGN PATENT DOCUMENTS

| | | |
|---|---|---|
| CA | 2 307 869 | 4/2000 |
| CH | 660531 | 4/1987 |

(Continued)

OTHER PUBLICATIONS

Borriello, Gaetano: "Survey on Information Appliances", Computer Society, 2002. http://www.computer.org/cga/articles/infoappli.htm, Oct. 8, 2003.

(Continued)

*Primary Examiner* — Hung Dang
(74) *Attorney, Agent, or Firm* — Knobbe Martens Olson & Bear, LLP

(57) ABSTRACT

Systems and methods of displaying an image on an E-Paper display insert in eyeglasses or other brittle structures are disclosed. E-Paper displays provide a changeable medium where an image such as a logo may be displayed and maintained with little to no energy. The E-Paper display may be changeable by emitting a charge from a source such as a battery or an electrically connected docking system.

21 Claims, 11 Drawing Sheets

(56) References Cited

U.S. PATENT DOCUMENTS

| | | |
|---|---|---|
| D130,310 S | 11/1941 | Monjar |
| 2,424,935 A | 7/1947 | Kimmel |
| 2,482,195 A | 9/1949 | Martin |
| 2,504,524 A | 4/1950 | Hayward |
| 2,688,900 A | 9/1954 | Silverman |
| 2,856,466 A | 10/1958 | Gustafson et al. |
| 2,882,348 A | 4/1959 | Erickson |
| 2,915,598 A | 12/1959 | Brunton |
| 2,947,822 A | 8/1960 | Matsuura |
| 2,999,136 A | 9/1961 | Holt et al. |
| 3,104,290 A | 9/1963 | Rosemond et al. |
| 3,119,903 A | 1/1964 | Rosemond et al. |
| D201,050 S | 5/1965 | Gieseking et al. |
| 3,247,330 A | 4/1966 | Hinman |
| D207,919 S | 6/1967 | Lui Fai |
| 3,327,836 A | 6/1967 | Burt |
| 3,371,979 A | 3/1968 | Catanzaro |
| D212,863 S | 12/1968 | Roberts |
| 3,495,898 A | 2/1970 | Del Vecchio |
| 3,536,385 A | 10/1970 | Johnston |
| 3,588,384 A | 6/1971 | Negley |
| 3,665,122 A | 5/1972 | Weiss |
| D228,677 S | 10/1973 | Wichers |
| 3,769,663 A | 11/1973 | Perl |
| D229,974 S | 1/1974 | Wichers et al. |
| 3,809,829 A | 5/1974 | Viginni et al. |
| 3,853,393 A | 12/1974 | Fila et al. |
| 3,883,701 A | 5/1975 | Delorenzo |
| 3,943,925 A | 3/1976 | Leight |
| 3,957,184 A | 5/1976 | Shurman |
| 4,006,974 A | 2/1977 | Resnick |
| 4,149,780 A | 4/1979 | Young |
| 4,247,178 A | 1/1981 | Cook |
| 4,283,127 A | 8/1981 | Rosenwinkel et al. |
| 4,294,792 A | 10/1981 | Arons et al. |
| 4,516,157 A | 5/1985 | Campbell |
| 4,537,612 A | 8/1985 | Borrelli et al. |
| 4,550,984 A | 11/1985 | Reymond |
| 4,584,721 A | 4/1986 | Yamamoto |
| 4,600,077 A | 7/1986 | Drever |
| D287,021 S | 12/1986 | Johnson |
| 4,636,048 A | 1/1987 | Jones |
| 4,683,587 A | 7/1987 | Silverman |
| D292,986 S | 12/1987 | Magestro |
| 4,712,244 A | 12/1987 | Zwicker |
| 4,773,095 A | 9/1988 | Zwicker |
| 4,803,487 A | 2/1989 | Willard et al. |
| 4,806,008 A | 2/1989 | Tarloff |
| 4,806,011 A | 2/1989 | Bettinger |
| 4,856,086 A | 8/1989 | McCullough |
| 4,869,575 A | 9/1989 | Kubik |
| 4,877,320 A | 10/1989 | Holden |
| 4,882,769 A | 11/1989 | Gallimore |
| 4,901,355 A | 2/1990 | Moore |
| 4,902,120 A | 2/1990 | Weyer |
| 4,904,078 A | 2/1990 | Gorike |
| 4,942,629 A | 7/1990 | Stadlmann |
| 4,943,152 A | 7/1990 | Whelen |
| 5,020,150 A | 5/1991 | Shannon |
| 5,029,216 A | 7/1991 | Jhabvala |
| 5,050,150 A | 9/1991 | Ikeda |
| D325,590 S | 4/1992 | Galy |
| 5,123,726 A | 6/1992 | Webster |
| 5,137,342 A | 8/1992 | Jannard |
| 5,159,639 A | 10/1992 | Shannon et al. |
| 5,185,620 A | 2/1993 | Cooper |
| 5,249,001 A | 9/1993 | Jannard |
| 5,260,997 A | 11/1993 | Gattey |
| 5,281,957 A | 1/1994 | Schoolman |
| 5,321,443 A | 6/1994 | Huber et al. |
| 5,327,178 A | 7/1994 | McManigal |
| 5,335,285 A | 8/1994 | Gluz |
| 5,353,378 A | 10/1994 | Hoffman et al. |
| 5,367,345 A | 11/1994 | da Silva |
| 5,369,415 A | 11/1994 | Richard et al. |
| 5,381,114 A | 1/1995 | Pena-Finol et al. |
| 5,404,385 A | 4/1995 | Ben-Haim |
| 5,406,340 A | 4/1995 | Hoff |
| 5,452,480 A | 9/1995 | Ryden |
| RE35,051 E | 10/1995 | Moore |
| 5,459,533 A | 10/1995 | McCooeye et al. |
| 5,467,104 A | 11/1995 | Furness, III et al. |
| 5,481,763 A | 1/1996 | Brostrom et al. |
| 5,483,303 A | 1/1996 | Hirschman |
| 5,483,691 A | 1/1996 | Heck et al. |
| 5,533,130 A | 7/1996 | Staton |
| 5,557,444 A | 9/1996 | Melville et al. |
| 5,563,951 A | 10/1996 | Wang et al. |
| 5,579,400 A | 11/1996 | Ballein |
| 5,581,492 A | 12/1996 | Janik |
| 5,583,584 A | 12/1996 | Friedman |
| 5,585,871 A | 12/1996 | Linden |
| 5,590,417 A | 12/1996 | Rydbeck |
| 5,596,339 A | 1/1997 | Furness, III et al. |
| 5,606,743 A | 2/1997 | Vogt et al. |
| 5,608,808 A | 3/1997 | da Silva |
| 5,613,222 A | 3/1997 | Guenther |
| 5,617,477 A | 4/1997 | Boyden |
| 5,634,201 A | 5/1997 | Mooring |
| 5,654,786 A | 8/1997 | Bylander |
| 5,658,502 A | 8/1997 | Hughes |
| 5,668,867 A | 9/1997 | Nagai |
| 5,671,035 A | 9/1997 | Barnes |
| 5,671,037 A | 9/1997 | Ogasawara et al. |
| 5,680,465 A | 10/1997 | Boyden |
| 5,682,434 A | 10/1997 | Boyden |
| 5,694,475 A | 12/1997 | Boyden |
| 5,703,670 A | 12/1997 | Callard |
| 5,708,724 A | 1/1998 | Burris et al. |
| 5,715,323 A | 2/1998 | Walker |
| 5,715,337 A | 2/1998 | Spitzer |
| 5,717,479 A | 2/1998 | Rickards |
| 5,721,783 A | 2/1998 | Anderson |
| D392,990 S | 3/1998 | Hall et al. |
| 5,737,436 A | 4/1998 | Boyden |
| 5,757,929 A | 5/1998 | Wang et al. |
| 5,760,868 A | 6/1998 | Jannard et al. |
| 5,777,715 A | 7/1998 | Kruegle et al. |
| 5,781,272 A | 7/1998 | Bright et al. |
| 5,796,341 A | 8/1998 | Stratiotis |
| 5,805,261 A | 9/1998 | Houston et al. |
| 5,815,126 A | 9/1998 | Fan et al. |
| 5,835,185 A | 11/1998 | Kallman et al. |
| 5,853,005 A | 12/1998 | Scanlon |
| 5,867,572 A | 2/1999 | MacDonald et al. |
| 5,886,822 A | 3/1999 | Spitzer |
| 5,889,843 A | 3/1999 | Singer et al. |
| 5,892,564 A | 4/1999 | Rahn |
| 5,903,395 A | 5/1999 | Rallison et al. |
| 5,909,498 A | 6/1999 | Smith |
| 5,924,868 A | 7/1999 | Rod |
| 5,953,000 A | 9/1999 | Weirich |
| 5,953,434 A | 9/1999 | Boyden |
| 5,971,538 A | 10/1999 | Heffner |
| 5,973,728 A | 10/1999 | Levitan |
| 5,978,689 A | 11/1999 | Tuoriniemi et al. |
| 5,986,813 A | 11/1999 | Saikawa et al. |
| 5,988,812 A | 11/1999 | Wingate |
| 5,991,085 A | 11/1999 | Rallison et al. |
| 5,995,592 A | 11/1999 | Shirai et al. |
| D418,153 S | 12/1999 | Haney |
| 6,006,115 A | 12/1999 | Wingate |
| 6,007,035 A | 12/1999 | Feinbloom et al. |
| 6,010,216 A | 1/2000 | Jesiek |
| 6,012,812 A | 1/2000 | Rickards |
| 6,013,108 A | 1/2000 | Karolys et al. |
| 6,018,742 A | 1/2000 | Herbert, III |
| 6,023,241 A | 2/2000 | Clapper |
| 6,023,372 A | 2/2000 | Spitzer et al. |
| 6,030,342 A | 2/2000 | Amano et al. |
| 6,057,966 A | 5/2000 | Carroll et al. |
| D426,845 S | 6/2000 | Green et al. |
| 6,074,060 A | 6/2000 | Bruce |
| 6,084,555 A | 7/2000 | Mizoguchi et al. |

(56) References Cited

U.S. PATENT DOCUMENTS

| | | |
|---|---|---|
| 6,084,556 A | 7/2000 | Zwern |
| 6,091,546 A | 7/2000 | Spitzer |
| 6,091,812 A | 7/2000 | Iglehart et al. |
| 6,091,832 A | 7/2000 | Shurman et al. |
| D430,145 S | 8/2000 | Boyden et al. |
| 6,106,116 A | 8/2000 | Houston et al. |
| 6,108,197 A | 8/2000 | Janik |
| 6,110,110 A | 8/2000 | Dublin, Jr. et al. |
| 6,126,595 A | 10/2000 | Amano et al. |
| 6,142,623 A | 11/2000 | Jones |
| 6,149,272 A | 11/2000 | Bergner et al. |
| D435,058 S | 12/2000 | Green et al. |
| 6,157,533 A | 12/2000 | Sallam et al. |
| 6,169,543 B1 | 1/2001 | Wehmeyer |
| 6,176,576 B1 | 1/2001 | Green et al. |
| 6,181,956 B1 | 1/2001 | Koskan |
| 6,192,253 B1 | 2/2001 | Charlier et al. |
| 6,204,974 B1 | 3/2001 | Spitzer |
| 6,211,799 B1 | 4/2001 | Post et al. |
| 6,212,414 B1 | 4/2001 | Alameh et al. |
| 6,212,424 B1 | 4/2001 | Robinson |
| 6,218,958 B1 | 4/2001 | Eichstaedt et al. |
| D441,388 S | 5/2001 | Lightman |
| 6,225,897 B1 | 5/2001 | Doyle et al. |
| 6,230,327 B1 | 5/2001 | Briand et al. |
| 6,231,181 B1 | 5/2001 | Swab |
| 6,233,344 B1 | 5/2001 | Clegg et al. |
| 6,233,345 B1 | 5/2001 | Urwyler |
| 6,239,778 B1 | 5/2001 | Palffy-Muhoray et al. |
| 6,243,578 B1 | 6/2001 | Koike |
| 6,252,970 B1 | 6/2001 | Poon et al. |
| D445,416 S | 7/2001 | Glezerman |
| 6,272,359 B1 | 8/2001 | Kivela et al. |
| 6,280,838 B1 | 8/2001 | Bernards et al. |
| 6,285,757 B1 | 9/2001 | Carroll et al. |
| 6,292,213 B1 | 9/2001 | Jones |
| 6,301,050 B1 | 10/2001 | DeLeon |
| 6,301,367 B1 | 10/2001 | Boyden et al. |
| 6,301,593 B1 | 10/2001 | Toyosato |
| 6,307,526 B1 | 10/2001 | Mann |
| 6,311,155 B1 | 10/2001 | Vaudrey et al. |
| 6,312,811 B1 | 11/2001 | Frigoli et al. |
| 6,314,091 B1 | 11/2001 | LaRowe, Jr. et al. |
| 6,325,507 B1 | 12/2001 | Jannard et al. |
| 6,325,513 B1 | 12/2001 | Bergner et al. |
| 6,344,727 B1 | 2/2002 | Desai et al. |
| 6,347,095 B1 | 2/2002 | Tang et al. |
| 6,349,001 B1 | 2/2002 | Spitzer |
| 6,350,129 B1 | 2/2002 | Gorlick |
| 6,351,468 B1 | 2/2002 | LaRowe, Jr. et al. |
| 6,353,422 B1 | 3/2002 | Perlman |
| 6,353,503 B1 | 3/2002 | Spitzer et al. |
| 6,356,392 B1 | 3/2002 | Spitzer |
| 6,374,177 B1 | 4/2002 | Lee et al. |
| 6,381,484 B1 | 4/2002 | Ayanruoh |
| 6,384,982 B1 | 5/2002 | Spitzer |
| 6,392,798 B1 | 5/2002 | Newkirk |
| 6,409,338 B1 | 6/2002 | Jewell |
| 6,417,969 B1 | 7/2002 | DeLuca et al. |
| 6,421,031 B1 | 7/2002 | Ronzani et al. |
| 6,424,820 B1 | 7/2002 | Burdick et al. |
| 6,431,705 B1 | 8/2002 | Linden |
| 6,442,018 B1 | 8/2002 | Dinkin |
| D462,708 S | 9/2002 | Miller et al. |
| D462,946 S | 9/2002 | Beraut et al. |
| 6,445,805 B1 | 9/2002 | Grugel |
| 6,452,572 B1 | 9/2002 | Fan et al. |
| 6,452,699 B1 | 9/2002 | Athale et al. |
| 6,456,721 B1 | 9/2002 | Fukuda |
| 6,474,816 B2 | 11/2002 | Butler |
| 6,476,815 B1 | 11/2002 | Ando |
| 6,483,483 B2 | 11/2002 | Kosugi et al. |
| 6,490,362 B1 | 12/2002 | Clegg et al. |
| 6,493,136 B2 | 12/2002 | Chang et al. |
| 6,510,325 B1 | 1/2003 | Mack, II et al. |
| 6,517,203 B1 | 2/2003 | Blum et al. |
| 6,519,475 B1 | 2/2003 | Kim |
| 6,523,006 B1 | 2/2003 | Ellis et al. |
| 6,529,804 B1 | 3/2003 | Draggon et al. |
| 6,538,799 B2 | 3/2003 | Spitzer |
| 6,540,347 B1 | 4/2003 | Radziwon et al. |
| 6,542,081 B2 | 4/2003 | Torch |
| 6,546,101 B1 | 4/2003 | Murray et al. |
| 6,549,122 B2 | 4/2003 | Depta |
| 6,554,763 B1 | 4/2003 | Amano et al. |
| 6,560,029 B1 | 5/2003 | Dobbie et al. |
| 6,560,449 B1 | 5/2003 | Liu |
| 6,564,047 B1 | 5/2003 | Steele et al. |
| 6,567,651 B2 | 5/2003 | Whitley |
| 6,580,405 B1 | 6/2003 | Yamazaki et al. |
| 6,582,075 B1 | 6/2003 | Swab et al. |
| 6,614,407 B2 | 9/2003 | Perlman |
| 6,618,099 B1 | 9/2003 | Spitzer |
| 6,629,076 B1 | 9/2003 | Haken |
| 6,639,706 B2 | 10/2003 | Ziv et al. |
| 6,650,894 B1 | 11/2003 | Berstis et al. |
| 6,657,673 B2 | 12/2003 | Ishikawa |
| 6,687,486 B2 | 2/2004 | Grzeczkowski |
| 6,690,807 B1 | 2/2004 | Meyer |
| 6,691,028 B2 | 2/2004 | Bullock et al. |
| 6,717,533 B2 | 4/2004 | Seaberg et al. |
| 6,724,354 B1 | 4/2004 | Spitzer et al. |
| 6,725,022 B1 | 4/2004 | Clayton et al. |
| 6,728,531 B1 | 4/2004 | Lee et al. |
| 6,729,726 B2 | 5/2004 | Miller et al. |
| 6,731,908 B2 | 5/2004 | Berliner et al. |
| 6,733,130 B2 | 5/2004 | Blum et al. |
| 6,735,435 B2 | 5/2004 | Newell et al. |
| 6,736,759 B1 | 5/2004 | Stubbs et al. |
| 6,739,873 B1 | 5/2004 | Rod et al. |
| 6,763,119 B2 | 7/2004 | Lee |
| 6,766,182 B2 | 7/2004 | Janninck et al. |
| 6,769,767 B2 | 8/2004 | Swab et al. |
| 6,783,501 B2 | 8/2004 | Takahashi et al. |
| 6,816,314 B2 | 11/2004 | Shimizu et al. |
| 6,834,192 B1 | 12/2004 | Watanabe et al. |
| 6,834,509 B2 | 12/2004 | Palfy et al. |
| 6,851,805 B2 | 2/2005 | Blum et al. |
| 6,871,951 B2 | 3/2005 | Blum et al. |
| 6,873,862 B2 | 3/2005 | Reshefsky |
| 6,879,443 B2 | 4/2005 | Spitzer |
| 6,885,848 B2 | 4/2005 | Lee |
| 6,911,172 B2 | 6/2005 | Swab et al. |
| 6,912,386 B1 | 6/2005 | Himberg et al. |
| 6,920,283 B2 | 7/2005 | Goldstein |
| 6,929,365 B2 | 8/2005 | Swab et al. |
| 6,937,400 B2 | 8/2005 | Olsson |
| 6,937,803 B2 | 8/2005 | Bruegl |
| 6,941,248 B2 | 9/2005 | Friedrich et al. |
| 6,947,014 B2 | 9/2005 | Wooten |
| 6,950,531 B2 | 9/2005 | Rickards |
| 6,957,890 B2 | 10/2005 | Shapiro |
| 6,966,647 B2 | 11/2005 | Jannard et al. |
| 6,975,667 B2 | 12/2005 | Mattisson et al. |
| 6,978,162 B2 | 12/2005 | Russell et al. |
| 6,990,082 B1 | 1/2006 | Zehavi et al. |
| 7,004,582 B2 | 2/2006 | Jannard et al. |
| 7,013,009 B2 | 3/2006 | Warren |
| 7,023,621 B2 | 4/2006 | Dietrich |
| 7,031,483 B2 | 4/2006 | Boone et al. |
| 7,031,667 B2 | 4/2006 | Horiguchi |
| 7,044,615 B2 | 5/2006 | Gesten |
| 7,062,796 B1 | 6/2006 | Dixon |
| 7,084,736 B2 | 8/2006 | Ritter |
| 7,093,742 B2 | 8/2006 | Steven, III et al. |
| 7,097,300 B2 | 8/2006 | Himmele |
| 7,099,464 B2 | 8/2006 | Lucey et al. |
| 7,106,676 B2 | 9/2006 | Matos |
| 7,116,976 B2 | 10/2006 | Thomas et al. |
| 7,124,425 B1 | 10/2006 | Anderson |
| 7,133,532 B2 | 11/2006 | Rickards |
| 7,147,324 B2 | 12/2006 | Jannard et al. |
| 7,149,475 B2 | 12/2006 | Kawamura |
| 7,150,526 B2 | 12/2006 | Jannard et al. |

(56) References Cited

U.S. PATENT DOCUMENTS

| | | |
|---|---|---|
| 7,158,096 B1 | 1/2007 | Spitzer |
| 7,158,499 B2 | 1/2007 | Anderson et al. |
| 7,162,281 B2 | 1/2007 | Kim |
| 7,168,804 B2 | 1/2007 | Velazquez |
| 7,170,057 B2 | 1/2007 | Filipovich et al. |
| 7,185,983 B2 | 3/2007 | Nelson et al. |
| 7,187,948 B2 | 3/2007 | Alden |
| 7,187,960 B2 | 3/2007 | Abreu |
| 7,192,136 B2 | 3/2007 | Howell et al. |
| 7,192,137 B2 | 3/2007 | Ishibashi et al. |
| 7,195,353 B2 | 3/2007 | Blum et al. |
| 7,211,778 B1 | 5/2007 | Smith et al. |
| 7,213,917 B2 | 5/2007 | Jannard et al. |
| 7,216,973 B2 | 5/2007 | Jannard et al. |
| 7,219,994 B2 | 5/2007 | Jannard et al. |
| 7,231,038 B2 | 6/2007 | Warren |
| 7,242,527 B2 | 7/2007 | Spitzer |
| 7,245,273 B2 | 7/2007 | Eberl et al. |
| 7,249,846 B2 | 7/2007 | Grand et al. |
| 7,253,791 B2 | 8/2007 | Kahan et al. |
| 7,255,437 B2 | 8/2007 | Howell et al. |
| 7,261,409 B1 | 8/2007 | Taber |
| 7,264,350 B2 | 9/2007 | Jannard et al. |
| 7,278,734 B2 | 10/2007 | Jannard et al. |
| 7,289,640 B2 | 10/2007 | Tsai et al. |
| 7,289,767 B2 | 10/2007 | Lai |
| 7,292,703 B2 | 11/2007 | Kaulfuss et al. |
| 7,308,231 B2 | 12/2007 | Tung |
| 7,312,699 B2 | 12/2007 | Chornenky |
| 7,313,246 B2 | 12/2007 | Miller et al. |
| 7,321,785 B2 | 1/2008 | Harris |
| 7,331,666 B2 | 2/2008 | Swab et al. |
| 7,376,434 B2 | 5/2008 | Thomas et al. |
| 7,380,936 B2 | 6/2008 | Howell et al. |
| 7,381,952 B2 | 6/2008 | Teich et al. |
| 7,395,090 B2 | 7/2008 | Alden |
| 7,401,918 B2 | 7/2008 | Howell et al. |
| 7,409,234 B2 | 8/2008 | Glezerman |
| 7,410,254 B2 | 8/2008 | Goodis |
| 7,436,568 B1 | 10/2008 | Kuykendall, Jr. |
| 7,438,409 B2 | 10/2008 | Jordan |
| 7,438,410 B1 | 10/2008 | Howell et al. |
| 7,445,332 B2 | 11/2008 | Jannard et al. |
| 7,451,056 B2 | 11/2008 | Flentov et al. |
| 7,452,073 B2 | 11/2008 | Jannard et al. |
| 7,461,936 B2 | 12/2008 | Jannard |
| 7,467,866 B2 | 12/2008 | Chao |
| 7,481,531 B2 | 1/2009 | Howell et al. |
| 7,484,847 B2 | 2/2009 | Fuziak, Jr. |
| 7,488,294 B2 | 2/2009 | Torch |
| 7,490,936 B2 | 2/2009 | Blum et al. |
| 7,494,216 B2 | 2/2009 | Jannard et al. |
| 7,496,293 B2 | 2/2009 | Shamir et al. |
| 7,500,746 B1 | 3/2009 | Howell et al. |
| 7,500,747 B2 | 3/2009 | Howell et al. |
| 7,512,414 B2 | 3/2009 | Jannard et al. |
| 7,520,614 B2 | 4/2009 | Joos et al. |
| 7,527,375 B2 | 5/2009 | Blum et al. |
| 7,530,688 B2 | 5/2009 | Grogan et al. |
| 7,543,934 B2 | 6/2009 | Howell et al. |
| 7,547,101 B2 | 6/2009 | Fuziak |
| 7,576,800 B2 | 8/2009 | Swain |
| 7,576,919 B2 | 8/2009 | Durner et al. |
| 7,581,833 B2 | 9/2009 | Howell et al. |
| 7,617,071 B2 | 11/2009 | Darley et al. |
| 7,621,634 B2 | 11/2009 | Howell et al. |
| 7,631,968 B1 | 12/2009 | Dobson et al. |
| 7,639,209 B2 | 12/2009 | Sprague et al. |
| 7,647,400 B2 | 1/2010 | Abbott et al. |
| 7,648,236 B1 | 1/2010 | Dobson |
| D610,184 S | 2/2010 | Pearson et al. |
| 7,665,845 B2 | 2/2010 | Kiderman et al. |
| 7,675,683 B2 | 3/2010 | Dobson |
| 7,677,722 B1 | 3/2010 | Mednick et al. |
| 7,677,723 B2 | 3/2010 | Howell et al. |
| 7,682,018 B2 | 3/2010 | Jannard |
| 7,724,210 B2 | 5/2010 | Sprague et al. |
| 7,729,688 B2 | 6/2010 | Cheung et al. |
| 7,740,353 B2 | 6/2010 | Jannard |
| 7,744,213 B2 | 6/2010 | Jannard et al. |
| 7,753,523 B2 | 7/2010 | Kiderman et al. |
| 7,758,185 B2 | 7/2010 | Lewis |
| 7,760,898 B2 | 7/2010 | Howell et al. |
| 7,771,046 B2 | 8/2010 | Howell et al. |
| 7,784,935 B2 | 8/2010 | Jackson et al. |
| 7,786,424 B2 | 8/2010 | Durner et al. |
| 7,792,552 B2 | 9/2010 | Thomas et al. |
| 7,798,638 B2 | 9/2010 | Fuziak, Jr. |
| 7,806,525 B2 | 10/2010 | Howell et al. |
| 7,810,750 B2 | 10/2010 | Abreu |
| 7,843,403 B2 | 11/2010 | Spitzer |
| 7,856,173 B2 | 12/2010 | Chujo et al. |
| 7,866,818 B2 | 1/2011 | Schroeder et al. |
| 7,869,128 B2 | 1/2011 | Yamaguchi et al. |
| 7,874,669 B2 | 1/2011 | Moritz et al. |
| 7,890,128 B1 | 2/2011 | Thomas et al. |
| 7,893,965 B2 | 2/2011 | Heim et al. |
| 7,900,068 B2 | 3/2011 | Sptizer |
| 7,918,556 B2 | 4/2011 | Lewis |
| 7,922,321 B2 | 4/2011 | Howell et al. |
| 7,931,367 B2 | 4/2011 | Jackson et al. |
| 7,931,373 B2 | 4/2011 | Hillis et al. |
| 7,959,287 B1 | 6/2011 | Saffra |
| 7,967,433 B2 | 6/2011 | Jannard et al. |
| 7,967,435 B1 | 6/2011 | Seeto |
| 7,971,994 B2 | 7/2011 | Blum et al. |
| 7,988,283 B2 | 8/2011 | Jannard |
| 7,997,723 B2 | 8/2011 | Pienimaa et al. |
| 8,010,156 B2 | 8/2011 | Warren |
| D645,492 S | 9/2011 | Zhao |
| D645,493 S | 9/2011 | Zhao |
| 8,020,989 B2 | 9/2011 | Jannard et al. |
| 8,025,398 B2 | 9/2011 | Jannard |
| D646,316 S | 10/2011 | Zhao |
| 8,068,169 B2 | 11/2011 | Chang |
| 8,086,287 B2 | 12/2011 | Mooney et al. |
| 8,104,892 B2 | 1/2012 | Hillis et al. |
| 8,109,629 B2 | 2/2012 | Howell et al. |
| 8,112,104 B1 | 2/2012 | Thomas et al. |
| 8,123,351 B2 | 2/2012 | Moritz et al. |
| 8,128,606 B2 | 3/2012 | Anderson et al. |
| 8,136,170 B2 | 3/2012 | DiPaola |
| 8,188,880 B1 | 5/2012 | Chi et al. |
| 8,204,435 B2 | 6/2012 | Seshadri et al. |
| 8,212,855 B2 | 7/2012 | Gupta et al. |
| 8,243,973 B2 | 8/2012 | Rickards et al. |
| 8,259,159 B2 | 9/2012 | Hu |
| 8,269,159 B2 | 9/2012 | Filipovich et al. |
| 8,280,419 B1 | 10/2012 | Thomas et al. |
| 8,289,231 B2 | 10/2012 | Budd et al. |
| 8,310,555 B2 | 11/2012 | Ludlow |
| 8,313,192 B2 | 11/2012 | Jannard |
| 8,325,263 B2 | 12/2012 | Kato et al. |
| 8,333,475 B2 | 12/2012 | Sugio et al. |
| 8,337,013 B2 | 12/2012 | Howell et al. |
| 8,337,014 B2 | 12/2012 | Kokonaski et al. |
| D674,834 S * | 1/2013 | Esson .................. D16/309 |
| 8,353,594 B2 | 1/2013 | Lewis |
| 8,378,924 B2 | 2/2013 | Jacobsen et al. |
| 8,414,131 B2 | 4/2013 | Tanaka |
| 8,430,507 B2 | 4/2013 | Howell et al. |
| 8,430,510 B2 | 4/2013 | Sugio et al. |
| 8,431,881 B2 | 4/2013 | Filipovich et al. |
| 8,434,863 B2 | 5/2013 | Howell et al. |
| 8,434,868 B2 | 5/2013 | Sato et al. |
| 8,446,676 B2 | 5/2013 | Sugihara et al. |
| 8,449,116 B2 | 5/2013 | Sato et al. |
| 8,465,151 B2 | 6/2013 | Howell et al. |
| 8,473,004 B2 | 6/2013 | Warren |
| 8,482,488 B2 | 7/2013 | Jannard |
| 8,500,271 B2 | 8/2013 | Howell et al. |
| 8,503,703 B2 | 8/2013 | Eaton et al. |
| 8,523,352 B2 | 9/2013 | Jannard et al. |
| 8,550,621 B2 | 10/2013 | Jannard |

(56) References Cited

U.S. PATENT DOCUMENTS

| | | |
|---|---|---|
| 8,550,649 B2 | 10/2013 | Nelson et al. |
| 8,553,910 B1 | 10/2013 | Dong et al. |
| 8,566,962 B2 | 10/2013 | Cornelius |
| 8,622,885 B2 | 1/2014 | Mersky |
| 8,721,562 B2 | 5/2014 | Abreu |
| 8,737,978 B1 | 5/2014 | Thomas et al. |
| 8,744,113 B1 | 6/2014 | Rickards |
| 8,744,407 B2 | 6/2014 | Cheung et al. |
| 8,758,021 B2 | 6/2014 | Takahashi |
| 8,770,742 B2 | 7/2014 | Howell et al. |
| 8,787,970 B2 | 7/2014 | Warren |
| 8,801,174 B2 | 8/2014 | Willey |
| 8,854,429 B2 | 10/2014 | Seo et al. |
| 8,855,719 B2 | 10/2014 | Jacobsen et al. |
| 8,876,285 B2 | 11/2014 | Jannard |
| 8,878,914 B2 | 11/2014 | Mashitani et al. |
| 8,891,817 B2 | 11/2014 | Wexler et al. |
| 8,902,303 B2 | 12/2014 | Na'aman et al. |
| 8,905,542 B2 | 12/2014 | Howell et al. |
| 8,920,013 B2 | 12/2014 | Nakamura |
| 8,928,752 B2 | 1/2015 | DeKeyser |
| 9,016,857 B2 | 4/2015 | Benko et al. |
| 9,028,062 B2 | 5/2015 | Kokonaski et al. |
| 9,028,123 B2 | 5/2015 | Nichol et al. |
| 9,140,910 B2 | 9/2015 | Filutowski et al. |
| 9,451,068 B2 | 9/2016 | Warren |
| 9,494,807 B2 | 11/2016 | Jannard |
| 9,619,201 B2 | 4/2017 | Jannard et al. |
| 2001/0009410 A1 | 7/2001 | Fujita |
| 2001/0038491 A1 | 11/2001 | Fergason |
| 2002/0039063 A1 | 4/2002 | Ritter |
| 2002/0039170 A1 | 4/2002 | Jannard et al. |
| 2002/0044152 A1 | 4/2002 | Abbott, III et al. |
| 2002/0085175 A1 | 7/2002 | Butler |
| 2002/0085843 A1 | 7/2002 | Mann |
| 2002/0087330 A1 | 7/2002 | Lee et al. |
| 2002/0093466 A1 | 7/2002 | Ben-Arie |
| 2002/0098877 A1 | 7/2002 | Glezerman |
| 2002/0098878 A1 | 7/2002 | Mooney et al. |
| 2002/0111197 A1 | 8/2002 | Fitzgerald |
| 2002/0118825 A1 | 8/2002 | Mitra |
| 2002/0143912 A1 | 10/2002 | Michels |
| 2002/0159023 A1 | 10/2002 | Swab et al. |
| 2002/0169539 A1 | 11/2002 | Menard et al. |
| 2002/0170147 A1 | 11/2002 | Heller |
| 2002/0176330 A1 | 11/2002 | Ramonowski et al. |
| 2002/0186180 A1 | 12/2002 | Duda |
| 2002/0197961 A1 | 12/2002 | Warren |
| 2003/0003969 A1 | 1/2003 | Tong et al. |
| 2003/0018274 A1 | 1/2003 | Takahashi et al. |
| 2003/0022690 A1 | 1/2003 | Beyda et al. |
| 2003/0026586 A1 | 2/2003 | Bruegl et al. |
| 2003/0036360 A1 | 2/2003 | Russell et al. |
| 2003/0058406 A1 | 3/2003 | Blum et al. |
| 2003/0067585 A1 | 4/2003 | Miller et al. |
| 2003/0068057 A1 | 4/2003 | Miller et al. |
| 2003/0073460 A1 | 4/2003 | van Pelt et al. |
| 2003/0090439 A1 | 5/2003 | Spitzer |
| 2003/0156725 A1 | 8/2003 | Boone et al. |
| 2003/0162510 A1 | 8/2003 | Kim |
| 2004/0000733 A1 | 1/2004 | Swab et al. |
| 2004/0015403 A1 | 1/2004 | Moskowitz et al. |
| 2004/0029582 A1 | 2/2004 | Swab et al. |
| 2004/0044418 A1 | 3/2004 | Goldstein |
| 2004/0044427 A1 | 3/2004 | Neuhaus |
| 2004/0048569 A1 | 3/2004 | Kawamura |
| 2004/0072134 A1 | 4/2004 | Takahashi |
| 2004/0120035 A1 | 6/2004 | Hoffmann |
| 2004/0128399 A1 | 7/2004 | Kurrasch |
| 2004/0128737 A1 | 7/2004 | Gesten |
| 2004/0132509 A1 | 7/2004 | Glezerman |
| 2004/0136293 A1 | 7/2004 | Matos |
| 2004/0156012 A1 | 8/2004 | Jannard et al. |
| 2004/0157649 A1 | 8/2004 | Jannard et al. |
| 2004/0160571 A1 | 8/2004 | Jannard et al. |
| 2004/0160572 A1 | 8/2004 | Jannard et al. |
| 2004/0160573 A1 | 8/2004 | Jannard et al. |
| 2004/0212776 A1 | 10/2004 | Spitzer et al. |
| 2004/0239874 A1 | 12/2004 | Swab et al. |
| 2004/0240404 A1 | 12/2004 | Ibrahim et al. |
| 2005/0001981 A1 | 1/2005 | Anderson et al. |
| 2005/0040192 A1 | 2/2005 | Steven, III et al. |
| 2005/0041297 A1 | 2/2005 | He et al. |
| 2005/0046789 A1 | 3/2005 | Jannard et al. |
| 2005/0046790 A1 | 3/2005 | Jannard et al. |
| 2005/0052537 A1 | 3/2005 | Mizusawa |
| 2005/0128431 A1 | 6/2005 | Jannard et al. |
| 2005/0159182 A1 | 7/2005 | Lai |
| 2005/0174651 A1 | 8/2005 | Spitzer |
| 2005/0185815 A1 | 8/2005 | Rickards |
| 2005/0186993 A1 | 8/2005 | Yueh |
| 2005/0201585 A1 | 9/2005 | Jannard et al. |
| 2005/0202857 A1 | 9/2005 | Seshadri et al. |
| 2005/0208457 A1 | 9/2005 | Fink et al. |
| 2005/0208893 A1 | 9/2005 | Yueh |
| 2005/0219152 A1 | 10/2005 | Budd et al. |
| 2005/0225867 A1 | 10/2005 | Ishibashi et al. |
| 2005/0238194 A1 | 10/2005 | Chornenky |
| 2005/0239502 A1 | 10/2005 | Swab et al. |
| 2005/0248722 A1 | 11/2005 | Nelis |
| 2005/0264502 A1 | 12/2005 | Sprague et al. |
| 2005/0275714 A1 | 12/2005 | Ishikawa et al. |
| 2005/0283263 A1 | 12/2005 | Eaton et al. |
| 2006/0009154 A1 | 1/2006 | Tung |
| 2006/0023158 A1 | 2/2006 | Howell et al. |
| 2006/0028400 A1 | 2/2006 | Lapstun et al. |
| 2006/0030360 A1 | 2/2006 | Yeh |
| 2006/0034478 A1 | 2/2006 | Davenport |
| 2006/0046656 A1 | 3/2006 | Yang |
| 2006/0046736 A1 | 3/2006 | Pering |
| 2006/0072067 A1 | 4/2006 | Jannard et al. |
| 2006/0093178 A1 | 5/2006 | Chen |
| 2006/0109350 A1 | 5/2006 | Yeh |
| 2006/0132382 A1 | 6/2006 | Jannard |
| 2006/0146277 A1 | 7/2006 | Jannard et al. |
| 2006/0160573 A1 | 7/2006 | Montvay |
| 2006/0183427 A1 | 8/2006 | Warren |
| 2006/0187404 A1 | 8/2006 | Ifergan |
| 2006/0192306 A1 | 8/2006 | Giller |
| 2006/0197907 A1 | 9/2006 | Jannard et al. |
| 2006/0203183 A1 | 9/2006 | Jannard et al. |
| 2006/0203184 A1 | 9/2006 | Jannard et al. |
| 2007/0000033 A1 | 1/2007 | Dixon |
| 2007/0008484 A1 | 1/2007 | Jannard |
| 2007/0013863 A1 | 1/2007 | Zelazowski |
| 2007/0013864 A1 | 1/2007 | Dietz |
| 2007/0030442 A1 | 2/2007 | Howell et al. |
| 2007/0037520 A1 | 2/2007 | Warren |
| 2007/0046887 A1 | 3/2007 | Howell et al. |
| 2007/0064311 A1 | 3/2007 | Park |
| 2007/0081123 A1 | 4/2007 | Lewis |
| 2007/0081124 A1 | 4/2007 | Lewis |
| 2007/0081125 A1 | 4/2007 | Lewis |
| 2007/0201000 A1 | 8/2007 | Jackson et al. |
| 2007/0208531 A1 | 9/2007 | Darley et al. |
| 2007/0222940 A1 | 9/2007 | Cohen |
| 2007/0225550 A1 | 9/2007 | Gattani et al. |
| 2008/0013037 A1 | 1/2008 | Carollo |
| 2008/0055410 A1 | 3/2008 | DeKeyser |
| 2008/0058681 A1 | 3/2008 | Casali et al. |
| 2008/0089545 A1 | 4/2008 | Jannard et al. |
| 2008/0144854 A1 | 6/2008 | Abreu |
| 2008/0158506 A1 | 7/2008 | Fuziak |
| 2008/0165317 A1 | 7/2008 | Wilson |
| 2008/0169998 A1 | 7/2008 | Jacobsen et al. |
| 2008/0192114 A1 | 8/2008 | Pearson et al. |
| 2008/0198324 A1 | 8/2008 | Fuziak |
| 2008/0204589 A1 | 8/2008 | Chang |
| 2008/0239232 A1 | 10/2008 | Guerrero |
| 2008/0246694 A1 | 10/2008 | Fischer |
| 2008/0273084 A1 | 11/2008 | MacDougall et al. |
| 2008/0284974 A1 | 11/2008 | Siu |
| 2008/0309586 A1 | 12/2008 | Vitale |
| 2009/0015929 A1 | 1/2009 | DeJong et al. |

(56) References Cited

U.S. PATENT DOCUMENTS

| | | |
|---|---|---|
| 2009/0040361 A1 | 2/2009 | Heim et al. |
| 2009/0059381 A1 | 3/2009 | Jannard |
| 2009/0066910 A1 | 3/2009 | Jannard et al. |
| 2009/0073330 A1 | 3/2009 | Viala |
| 2009/0086159 A1 | 4/2009 | Jannard |
| 2009/0122253 A1 | 5/2009 | Clay |
| 2009/0128700 A1 | 5/2009 | Oshino et al. |
| 2009/0180194 A1 | 7/2009 | Yamaguchi et al. |
| 2009/0180195 A1 | 7/2009 | Cakmakci et al. |
| 2009/0190026 A1 | 7/2009 | Chen |
| 2009/0201460 A1 | 8/2009 | Blum et al. |
| 2009/0201466 A1 | 8/2009 | Knecht et al. |
| 2009/0213236 A1 | 8/2009 | Chiou et al. |
| 2009/0251661 A1 | 10/2009 | Fuziak, Jr. |
| 2009/0307828 A1 | 12/2009 | Ludlow |
| 2010/0002186 A1 | 1/2010 | Zelman |
| 2010/0026970 A1 | 2/2010 | Tanaka |
| 2010/0053591 A1 | 3/2010 | Gibson et al. |
| 2010/0110368 A1 | 5/2010 | Chaum |
| 2010/0111472 A1 | 5/2010 | DeJong |
| 2010/0118402 A1 | 5/2010 | Washisu |
| 2010/0128135 A1 | 5/2010 | Filipovich et al. |
| 2010/0177168 A1 | 7/2010 | Hu |
| 2010/0177201 A1 | 7/2010 | Filipovich et al. |
| 2010/0188489 A1 | 7/2010 | Mashitani et al. |
| 2010/0208121 A1 | 8/2010 | Kato et al. |
| 2010/0220282 A1 | 9/2010 | Moritz et al. |
| 2010/0238396 A1 | 9/2010 | Jannard |
| 2010/0245755 A1 | 9/2010 | Sugihara et al. |
| 2010/0253904 A1 | 10/2010 | Jannard |
| 2010/0265455 A1 | 10/2010 | Jannard et al. |
| 2010/0277563 A1 | 11/2010 | Gupta et al. |
| 2010/0309426 A1 | 12/2010 | Howell et al. |
| 2010/0309427 A1 | 12/2010 | Warren |
| 2011/0013283 A1 | 1/2011 | Sato |
| 2011/0043644 A1 | 2/2011 | Munger et al. |
| 2011/0050546 A1 | 3/2011 | Swartz, Jr. et al. |
| 2011/0080555 A1 | 4/2011 | Chow |
| 2011/0085135 A1 | 4/2011 | Bertolli |
| 2011/0102733 A1 | 5/2011 | Moritz et al. |
| 2011/0170065 A1 | 7/2011 | Sugio et al. |
| 2011/0170066 A1 | 7/2011 | Sugio et al. |
| 2011/0170067 A1 | 7/2011 | Sato et al. |
| 2011/0178784 A1 | 7/2011 | Sato et al. |
| 2011/0187640 A1 | 8/2011 | Jacobsen et al. |
| 2011/0193963 A1 | 8/2011 | Hess et al. |
| 2011/0255050 A1 | 10/2011 | Jannard et al. |
| 2011/0261166 A1 | 10/2011 | Olazaran |
| 2011/0261176 A1 | 10/2011 | Monaghan, Sr. et al. |
| 2011/0273906 A1 | 11/2011 | Nichol et al. |
| 2011/0310345 A1 | 12/2011 | Warren |
| 2012/0013843 A1 | 1/2012 | Jannard |
| 2012/0069448 A1 | 3/2012 | Sugihara et al. |
| 2012/0081658 A1 | 4/2012 | Sugihara et al. |
| 2012/0105740 A1 | 5/2012 | Jannard et al. |
| 2012/0169854 A1 | 7/2012 | Seo et al. |
| 2012/0169990 A1 | 7/2012 | Burnstein |
| 2012/0210489 A1 | 8/2012 | Abreu |
| 2012/0212414 A1 | 8/2012 | Osterhout et al. |
| 2012/0220234 A1 | 8/2012 | Abreu |
| 2012/0224135 A1 | 9/2012 | Moritz |
| 2013/0072828 A1 | 3/2013 | Sweis et al. |
| 2013/0091623 A1 | 4/2013 | McCulloch et al. |
| 2013/0100410 A1 | 4/2013 | Liang |
| 2013/0100534 A1 | 4/2013 | Jannard |
| 2013/0128216 A1* | 5/2013 | Filutowski ............ G02C 11/10 351/51 |
| 2013/0212765 A1 | 8/2013 | Cornelius |
| 2013/0214998 A1 | 8/2013 | Andes et al. |
| 2013/0235331 A1 | 9/2013 | Heinrich et al. |
| 2013/0250232 A1 | 9/2013 | Belbey et al. |
| 2013/0250233 A1 | 9/2013 | Blum et al. |
| 2013/0281166 A1 | 10/2013 | Warren |
| 2013/0293448 A1 | 11/2013 | Jannard |
| 2014/0002629 A1 | 1/2014 | Ratcliff et al. |
| 2014/0027436 A1 | 1/2014 | Cornelius |
| 2014/0033409 A1 | 2/2014 | O'Malley et al. |
| 2014/0098424 A1 | 4/2014 | Jannard |
| 2014/0104566 A1 | 4/2014 | Kokonaski et al. |
| 2014/0160424 A1 | 6/2014 | Benko et al. |
| 2014/0168784 A1 | 6/2014 | Hiraki |
| 2014/0237709 A1 | 8/2014 | McCulloch et al. |
| 2014/0253868 A1 | 9/2014 | Jannard |
| 2014/0267645 A1 | 9/2014 | Wexler et al. |
| 2014/0267648 A1 | 9/2014 | Wexler et al. |
| 2014/0268016 A1 | 9/2014 | Chow et al. |
| 2014/0268017 A1 | 9/2014 | Sweis |
| 2014/0270244 A1 | 9/2014 | Fan |
| 2014/0270316 A1 | 9/2014 | Fan |
| 2014/0290054 A1 | 10/2014 | Etzkorn |
| 2014/0293215 A1 | 10/2014 | Blum et al. |
| 2014/0303687 A1 | 10/2014 | Wall et al. |
| 2014/0317836 A1 | 10/2014 | McCulloch et al. |
| 2014/0329519 A1 | 11/2014 | Warren |
| 2014/0374402 A1 | 12/2014 | Cornelius et al. |
| 2015/0053067 A1 | 2/2015 | Goldstein |
| 2015/0061837 A1 | 3/2015 | Honoré et al. |
| 2015/0062469 A1 | 3/2015 | Fleury |
| 2015/0116655 A1 | 4/2015 | Jannard |
| 2015/0177521 A1 | 6/2015 | Abdollahi et al. |
| 2016/0085092 A1 | 3/2016 | Calilung et al. |
| 2017/0090199 A1 | 3/2017 | Jannard |

FOREIGN PATENT DOCUMENTS

| | | | |
|---|---|---|---|
| CN | 2108942 | | 7/1992 |
| CN | 1234895 | A | 11/1999 |
| CN | 2583696 | Y | 10/2003 |
| CN | 1687817 | A | 10/2005 |
| CN | 2735373 | Y | 10/2005 |
| CN | 2760600 | Y | 2/2006 |
| CN | 201097024 | Y | 8/2008 |
| CN | 201637963 | U | 11/2010 |
| CN | 202583631 | U | 12/2012 |
| CN | 103207463 | A | 7/2013 |
| CN | 203084359 | U | 7/2013 |
| CN | 103263109 | A | 8/2013 |
| CN | 103293712 | A | 9/2013 |
| CN | 203204263 | U | 9/2013 |
| CN | 203217195 | U | 9/2013 |
| CN | 203217199 | U | 9/2013 |
| CN | 203275813 | U | 11/2013 |
| CN | 103957346 | A | 7/2014 |
| DE | 831 747 | C | 2/1952 |
| DE | 197 04 063 | A1 | 2/1999 |
| DE | 299 01 673 | U1 | 2/1999 |
| DE | 20 2004 004 378 | | 8/2004 |
| DE | 20 2006 004 294 | | 7/2006 |
| DE | 10 2005 054 317 | | 5/2007 |
| EP | 0 840 465 | | 5/1998 |
| EP | 1 544 665 | | 6/2005 |
| EP | 2 169 444 | | 3/2010 |
| ES | 2 299 399 | | 5/2008 |
| FR | 929 851 | | 1/1948 |
| FR | 1 160 007 | | 7/1958 |
| FR | 1 444 945 | | 10/1966 |
| FR | 2 157 260 | | 6/1973 |
| FR | 2 642 856 | | 8/1990 |
| FR | 2 789 499 | | 8/2000 |
| FR | 2 820 936 | | 8/2002 |
| GB | 497 375 | | 12/1938 |
| GB | 723 981 | | 2/1955 |
| GB | 2 362 474 | A | 11/2001 |
| GB | 2 401 772 | A | 11/2004 |
| IT | 00235504 | | 4/2000 |
| JP | 42-022998 | | 11/1942 |
| JP | 58-26282 | | 2/1983 |
| JP | 58-113912 | A | 7/1983 |
| JP | 58-113914 | A | 7/1983 |
| JP | 58113914 | A * | 7/1983 ............ G02C 11/00 |
| JP | 62-005024 | | 1/1987 |
| JP | 02-121661 | A | 5/1990 |
| JP | 03-027014 | A | 2/1991 |
| JP | 04-023579 | A | 1/1992 |

(56) References Cited

FOREIGN PATENT DOCUMENTS

| JP | 04-086642 A | 3/1992 |
|---|---|---|
| JP | 08-009483 A | 1/1996 |
| JP | 08-036143 | 2/1996 |
| JP | 10-513021 | 12/1998 |
| JP | 11-353444 | 12/1999 |
| JP | 2001 170103 A | 6/2001 |
| JP | 2001-522063 | 11/2001 |
| JP | 2002-085444 | 3/2002 |
| JP | 2002 252075 A | 9/2002 |
| JP | 2003-189398 | 7/2003 |
| JP | 2005-086522 A | 3/2005 |
| JP | 2007-148131 | 6/2007 |
| JP | 2008-545287 A | 12/2008 |
| JP | 2011-180414 A | 9/2011 |
| JP | 3171527 | 10/2011 |
| WO | WO 96/23373 | 8/1996 |
| WO | WO 97/25790 | 7/1997 |
| WO | WO 97/33270 | 9/1997 |
| WO | WO 99/23524 | 5/1999 |
| WO | WO 99/50706 | 10/1999 |
| WO | WO 00/65803 | 11/2000 |
| WO | WO 00/70390 | 11/2000 |
| WO | WO 00/70779 | 11/2000 |
| WO | WO 00/79329 | 12/2000 |
| WO | WO 00/79333 | 12/2000 |
| WO | WO 01/06298 | 1/2001 |
| WO | WO 01/95018 | 12/2001 |
| WO | WO 02/065198 | 8/2002 |
| WO | WO 03/067585 | 8/2003 |
| WO | WO 03/071830 | 8/2003 |
| WO | WO 2004/012477 | 2/2004 |
| WO | WO 2005/050288 | 6/2005 |
| WO | WO 2006/055884 | 5/2006 |
| WO | WO 2006/086699 | 8/2006 |
| WO | WO 2006/120416 | 11/2006 |
| WO | WO 2007/068808 | 6/2007 |
| WO | WO 2008/076774 | 6/2008 |
| WO | WO 2008/082718 | 7/2008 |
| WO | WO 2010/098902 | 9/2010 |
| WO | WO 2013/019893 | 2/2013 |
| WO | WO 2013/027752 | 2/2013 |
| WO | WO 2013/059257 | 4/2013 |
| WO | WO 2013/078442 | 5/2013 |
| WO | WO 2013/123262 | 8/2013 |
| WO | WO 2013/123264 | 8/2013 |
| WO | WO 2013/188343 | 12/2013 |
| WO | WO 2014/070770 | 5/2014 |
| WO | WO 2014/149631 | 9/2014 |
| WO | WO 2014/201213 | 12/2014 |
| WO | WO 2015/048564 | 4/2015 |

OTHER PUBLICATIONS

Ajluni, Cheryl. "Wearable Wireless Redefines Computer Usage", Wireless Systems Design, pp. 14-16, Dec. 2002.
Alderton, Megan: "The Bluetooth Question", RF Design. Jan. 1, 2001.
Bluetooth Specification Version 1.1, Feb. 22, 2001, pp. 1-452.
Complaint for Patent and Tradedress Infringement; U.S. District Court—Central District of California; Case No. SA-CV-7-1184 AHS (Anx); Oakley, Inc. v. Audio Visual Allstar dba AVAsunglasses.com; Filed Oct. 4, 2007; this lawsuit is settled and dismissed.
Complaint for Patent Infringement U.S. District—Central District of California; Case No. SACV 06-899 JVS (MLGx); Oakley, Inc. v. Xonix Electronics Co., Ltd., filed Sep. 26, 2006; this lawsuit has been dismissed.
Complaint for Patent Infringement; U.S. District—Central District of California; Case No. 03-6284 (GAF)(FMOx); QR Spex, Inc. and Thomas G. Swab v. Motorola, Inc. and Frog Design, Inc.; filed Sep. 3, 2003; this lawsuit was transferred to the Central District of California from the Eastern District of Texas and was dismissed.
Complaint for Patent Infringement; U.S. District Court—Central District of California, Southern Division; Case No. SACV 07-558 AG (RNBx); Oakley, Inc. v. Practical Enterprises, Inc., filed May 16, 2007; this lawsuit was settled and dismissed.
Complaint for Patent Infringement; U.S. District Court—Central District of California, Southern Division; Case No. SACV 07-57 DOC (Anx); Oakley, Inc. v. Blue Diamond International, filed Jan. 16, 2007; this lawsuit resulted in a default judgment.
Complaint for Patent Infringement; U.S. District Court—Central District of California, Southern Division; Case No. SACV 07-671 AG (RNBx); Oakley, Inc. v. XONIX (Zhuhai) Electronics Co., Ltd. et al., filed Jun. 7, 2007; this lawsuit was settled and dismissed.
Complaint for Patent Infringement; U.S. District Court—Central District of California, Southern Division; Case No. SACV 07-888 CJC (RCx); Oakley, Inc. v. The Pep Boys Manny Moe & Jack of California, Inc., filed Aug. 1, 2007; this lawsuit is settled and dismissed.
Complaint for Patent Infringement; U.S. District Court—Central District of California; Case No. 07-CV-1153 AHS (PJWx); Oakley, Inc. v. Zeal Optics, Inc.; filed Sep. 28, 2007; this lawsuit was dismissed.
Complaint of Patent Infringement; U.S. District Court—Central District of California; Case No. SACV 09-00062 JVS (Anx); Oakley, Inc. v. Spencer Gifts, LLC.: filed Jan. 14, 2009; this lawsuit was settled and dismissed.
De Herrera, Chris: "The Future of the Pocket PC", Pocket PC Magazine, 2003. http://www.pocketpcmag.com/ Mar02/future.asp, Oct. 8, 2003.
Decision Dismissing Request to Strike Detailed Request for Reexamination, received Jun. 11, 2009 in U.S. Appl. No. 90/009,088, 5 pages.
Defendant Motorola, Inc.'s Responses to Plaintiffs' First Set of Interrogatories; U.S. District Court—Central District of California; Case No. CV 3-6284 (FMOx); QR Spex, Inc. and Thomas G. Swab v. Motorola, Inc. and Frog Design, Inc.; dated Apr. 26, 2004; this lawsuit was transferred to the Central District of California from the Eastern District of Texas and was dismissed.
Defendant's Preliminary Invalidity Contentions re U.S. Pat. No. 7,331,666 and Addendum, U.S. District Court—Eastern District of Texas; Case No. 5:06CV124; U.S. District Court—Central District of California; Case No. SACV 06-627 CJC (RNBx); QR Spex, Inc. v. Oakley, Inc., Oakley Sales Corp., Oakley Direct, Inc., and Motorola, Inc.; filed Nov. 3, 2008; this lawsuit was consolidated and dismissed.
Defendants' Preliminary Invalidity Contentions re U.S. Pat. No. 6,769,767, including Exhibit, U.S. District Court-Eastern District of Texas; Case No. 5 :06CV124; U.S. District Court Central District of California; Case No. SACV 06-627 CJC (RNBx); QR Spex, Inc. v. Oakley, Inc., Oakley Sales Corp., Oakley Direct, Inc., and Motorola, Inc.; filed Jun. 16, 2008; this lawsuit is consolidated and dismissed.
Determination of Decision Granting Ex Parte Reexamination, received in U.S. Appl. No. 90/009,088, filed Jun. 12, 2008, 14 pages.
Determination of Decision Granting Ex Parte Reexamination, received in U.S. Appl. No. 90/009,112, filed Jun. 16, 2008, 14 pages.
DeVaul et al.: "The Memory Glasses: Subliminal vs. Overt Memory Support with Imperfect Information", 2002.
DeVaul, Richard W.: "The Memory Glasses Project", MIThril Media Lab, Oct. 28, 2003. http://www.media.mit.edu/wearables/mithril/memory-glasses.html.
Dorfman, Marjorie: "Wearable Technology: La Computer Mobile", Byte Back Online, 2003. http://www.bytebackonline.com/Articles_p/wearcomp_p.html, ct. 8, 2003.
Dresang, Joel: "Finns Fluent in Language of Cell Phones", JSOnline—Milwaukee Journal Sentinel, Apr. 15, 2000. http://www.isonline.com/bym/news/apr00/phone16041500a.asp?format=print. Accessed on Aug. 23, 2004.
Dressing in Digital Attire, Consumer Electronics Association—Vision, Nov./Dec. 2001. http://www.ce.org/publications/vision/2001/novdec/p08.asp?bc=cat&category_id=39. Dec. 5, 2003.
"Fashionable Eyewear Charms to add Color, Style & Fun to Eyeglass Frams", Ficklets—Eyewear Charm Huggers. http://www.ficklets.com. Jul. 22, 2009.
First Amended Complaint and Application for Permanent Injunction; U.S. District Court—Eastern District of Texas (Texarkana

(56) References Cited

OTHER PUBLICATIONS

Division); Civil Action No. 506 CV 124; *QR Spex, Inc. v. Motorola, Inc.; Oakley, Inc.; Oakley Sales Corp.; Oakley Direct Inc.; Zeal Optics, Inc.; Xonix Electronic Co., Ltd; and Kyocera Wireless Corp.*, filed Jul. 27, 2006; this lawsuit was transferred to the Central District of California from Eastern District of Texas and was dismissed.
First Amended Complaint for Patent Infringement; U.S. District—Central District of California; Case No. SACV 06-244 AHS (MLGx); *Oakley, Inc. v. Overstock.com, Inc., Wootcom, Inc. dba Synapse Micro, Inc., Global American Technologies, LLC., Aigo, Corp.*, filed Mar. 27, 2006; this lawsuit has been settled in part and dismissed.
First Amended Complaint for Patent Infringement; U.S. District Court—Central District of California; Case No. SACV May 1099 AHS (MLGx); *Oakley, Inc. v. BMW of North America, LLC.*, filed Nov. 28, 2005; this lawsuit has been settled and dismissed.
Franklin, Curt: How Bluetooth Works from www.howstuffworks.com, web site visited on Jun. 11, 2002.
Frog Design and Motorola Launch Prototypes of Next Generation of Wearable Wireless Solutions, Frog Design.com, 2003. http://www.frogdesign.com/company/news_press/press_releases/2003/pro046.html. Apr. 5, 2004.
Furan, Amy. "Computing on the Go", Techies.com, http://home.techies,com/Common/Career/2.Nerge060 100__m.js. Oct. 8, 2003.
Hands-Free Profile (HFP), Oct. 22, 2001, 71 pages.
Hattori, James: "Bluetooth Developers Aim to Usher in a Wireless Era", CNN.com-Technology-Computing. Sep. 1, 2000. http://cnn.com.
Headset Profile from Bluetooth Specification Version 1.1, Feb. 22, 2001, pp. 198-224.
Hieb, Barry MD. "The Electronic Age: The Future of Wearables", Advance Newsmagazine—for Nurse Practitioners, Mar. 5, 2001. http://www.advancefornp.com/common/editorial/PrintFriendly.aspx?CC~2160. Mar. 17, 2004.
International Preliminary Report on Patentability, re PCT Application No. PCT/US14/19989, issued Sep. 15, 2015.
International Search Report and Written Opinion, re PCT Application No. PCT/US14/19989, mailed Jan. 2, 2015.
International Search Report, re PCT Application No. PCT/US01/17540, mailed Oct. 26, 2001.
Invisible Eyewear Micro Display, the MicroOptical Corporation, Pre-2007 publication.
Kleinman, Neil. "Wearable Wear-Wearable computing in jewelry?", Pen Computing-Covering Mobile Computing and Communications. Issue 39, May 2001. http://www.pencomputing.com/wearableware/column39.html. Mar. 17, 2004.
Mann, Steve. "Wearable Computing: A First Step Toward Personal Imaging", Computer-Cybersquare, vol. 30, No. 2, Feb. 1997. http://wearcam.org/ieeecomputer/r2025.htm.
McKay, Niall. "You are What You Wear", The Feature.com, Aug. 7, 2000. http://www.thefeature.com/article?articleid=I223. Oct. 8, 2003.
Moran, John M. "Wrist Phones Step Out of the Comic Page", Chicago Tribune Online, Oct. 19, 2000. http://www.chica .. ./sns-ebiz-wireless101900wrist,0,3250718.stor. Oct. 8, 2003.
Motorola Bluetooth Wireless Headset User Guide, 2001, 27 pages.
Motorola Consumer Catalog for Phone Accessories from www.commerce.motorola.com,web site visited on Jun. 13, 2002.
Notice of Intent to Issue Ex Parte Reexamination Certificate, received Jul. 7, 2009 in U.S. Appl. No. 90/009,088, 10 pages.
Notice of Intent to Issue Ex Parte Reexamination Certificate, received Jul. 7, 2009 in U.S. Appl. No. 90/009,112, 11 pages.
OEM Developer Kits—DV-1 Wireless Digital Viewer, The MicroOptical Corporation—Making Portable Practical 2004. http://www.microopticalcorp.com/OEM/kitDV-1.html. Accessed on Apr. 20, 2004.
Office Action (Petition Decision Denying Request to Vacate as Non-Compliant) received in U.S. Appl. No. 90/009,088, mailed Mar. 11, 2009, 16 pages.

Office Action (Petition Decision Denying Request to Vacate as Non-Compliant) received in U.S. Appl. No. 90/009,112, mailed Mar. 11, 2009, 26 pages.
Patent Owner's Statement under 37 CFR. § 1.530, filed in U.S. Appl. No. 90/009,088, filed Aug. 12, 2008, 4 pages.
Patent Owner's Statement under 37 CFR. § 1.530, filed in U.S. Appl. No. 90/009,112, filed Aug. 13, 2008, 5 pages.
Pentland, Alex Sandy. "Wearable Information Devices", MIT Media Laboratory, pp. 12-67, 2001.
Petition Decision Denying Request to Vacate as Non-Compliant [37 CFR 1.181(a)&C], received in U.S. Appl. No. 90/009,112, filed Mar. 11, 2009, 5 pages.
Petition Decision Denying Request to Vacate as Non-Compliant [37 CFR 1.181(a)&C], received in U.S. Appl. No. 90/009,088, filed Jun. 11, 2009, 5 pages.
Petition under 37 CFR. 1.182 to Strike Detailed Request for Reexamination due to Non-Compliance with at Least MPEP 2205, filed in U.S. Appl. No. 90/009,088, filed Aug. 12, 2008, 4 pages.
Petition under 37 CFR. 1.182 to Strike Detailed Request for Reexamination due to Non-Compliance with at Least MPEP 2205, filed in U.S. Appl. No. 90/009,112, filed Aug. 13, 2008, 4 pages.
Piller, Charles. "Internet Guru's Theory of Evolution", LA Times.com, Apr. 3, 2000. http://latimes.com/print/business/20000403/t000031121.html, Oct. 8, 2003.
Piller, Charles: "Connecting the World through Internet Appliances", Patrickweb.com, Apr. 9, 2000, http://www.patrickweb.com/pp./int /appliances_iws2000.htm. Oct. 8, 2003.
Plaintiffs' Response to Defendant Motorola, Inc.'s First Set of Request for Admission; U.S. District Court—Central District of California; Case No. CV 03-6284 JFW (FMOx); *QR Spex, Inc. and Thomas G. Swab v. Motorola, Inc. And Frog Design, Inc.*; dated Mar. 12, 2004; this lawsuit was transferred to the Central District of California from the Eastern District of Texas and was dismissed.
Plaintiffs' Response to Defendant Motorola, Inc.'s First Set of Special Interrogatories; U.S. District Court—Central District of California; Case No. CV 03-6284 JFW (FMOx); *QR Spex, Inc. and Thomas G. Swab v. Motorola, Inc. and Frog Design, Inc.*; dated Mar. 12, 2004; this lawsuit was transferred to the Central District of California from the Eastern District of Texas and was dismissed.
Plaintiffs' Supplemental Response to Defendant Motorola, Inc.'s First Set of Interrogatories; U.S. District Court—Central District of California; Case No. CV 03-6284 JFW (FMOx); *QR Spex, Inc. and Thomas G. Swab v. Motorola, Inc. and Frog Design, Inc.*; dated May 18, 2004; this lawsuit was transferred to the Central District of California from the Eastern District of Texas and was dismissed.
Receipt of Original Ex Parte Request by Third Party, Filed in U.S. Appl. No. 90/009,088, filed Mar. 20, 2008, 60 pages.
Receipt of Original Ex Parte Request by Third Party, Filed in U.S. Appl. No. 90/009,112, filed Apr. 16, 2008, 75 pages.
Reexam Litigation Search conducted in U.S. Appl. No. 90/009,112, filed Jul. 1, 2009, 19 pages.
Reexam Litigation Search conducted in U.S. Appl. No. 90/009,112, filed Jun. 9, 2008, 14 pages.
Reexam Litigation Search conducted in U.S. Appl. No. 90/009,112, filed Mar. 4, 2009, 14 pages.
Reexam Litigation Search conducted in U.S. Appl. No. 90/099,088, filed Apr. 9, 2008, 30 pages.
Reexam Litigation Search conducted in U.S. Appl. No. 90/099,088, filed Jun. 30, 2009, 19 pages.
Reexam Litigation Search conducted in U.S. Appl. No. 90/099,088, filed Mar. 4, 2009, 11 pages.
Reply Memorandum of Points and Authorities in Support of Defendant Motorola, Inc.'s Motion for Summary Judgment; U.S. District Court—Central District of California; Case No. CV 03-6284 JFW (FMOx); *QR Spex, Inc. and Thomas G. Swab v. Motorola, Inc. and Frog Design, Inc.*; filed Jun. 7, 2004; this lawsuit was transferred to the Central District of California from the Eastern District of Texas and was dismissed.
Robbins, Alexandra. "A Display in Your Glasses", PC Magazine—The Independent Guide to Technology. Nov. 12, 2002. http://www.pcmag.com/article2/0,4149,667638,00.asp. Accessed on Dec. 5, 2003.

(56) References Cited

OTHER PUBLICATIONS

See What You're Missing—Electronic Images/data are Superimposed Over Your View of the World, Advertisements. The MicroOptical Corporation, Pre-1999 Publication.
Shivers, Olin. "BodyTalk and the BodyNet: A Personal Information Infrastructure", Massachusetts Institute of Technology, Laboratory for Computer Science-Personal Information Architecture Note 1, Dec. 1, 1993.
Special Product Review "ID Magazine", Aug. 2002, p. 179.
Spitzer, Mark B. "The Wristwatch: the bellwether for personal technology", Technology Reports.net, Mar. 26, 2003, http://technologyreports.netlnextinnovatorl?articleID=1636. Accessed on Oct. 8, 2003.
Star Trek Deep Space Nine, "A Time to Stand," Sep. 29, 1997 [ retrieved on Jul. 23, 2014]. Retrieved from the internet: <URL:http:www.cbs.com/shows/star_trek_deep_space_nine/video/O6sNiuXkHru5xXgETAISgA3YAguijlVLu/a-time-to-stand/>; minute marks 27:54, 33:17.
Stevens, Cindy Loftier. "A Glimpse into the Digital Future", Consumer Electronics, Mar./Apr. 2000, http://www.ce.org/publications/vision..  .1pg21.asp?category id=3. Accessed on Oct. 8, 2003.
Stipulation and Amend Pleadings in Consolidated Cases Transferred from Eastern District of Texas; U.S. District Court—Central District of California, Southern Division; Case No. 07CV-00987 CJC (RNBx); *QR Spex, Inc.* v. *Motorola, Inc. et al.*; filed Sep. 5, 2007; this lawsuit was transferred to the Central District of California from the Eastern District of Texas and was dismissed.
Substance and Style, by Motorola and Frog Design, Motorola. Time Nov. 17, 2003.
Summons for Complaint for Patent Infringement; U.S. District Court—Central District of California; Case No. CV 09-624 CAS (JWJx); *Oakley, Inc.* v. *DIGITALRISE, LLC.*; filed Jan. 27, 2009; a default judgment was ordered.
The Ultimate Device, Accenture, Nov. 7, 2000. http://www.accenture.com/xd.asp?it=enWeb &xd=Services%5CTechnology%Ctech_ultimate.html. Accessed on Oct. 8, 2003.
Theil, Stefan. "Love Those Wearables!", Newsweek, Apr. 9, 2001. http://nl.newsbank.com/nl-search/we/Archives?p_action~doc&p_docid=0EC05F8D8A26. Apr. 15, 2004.
Turoff. "Wearable Computers", Fall 1999 Semester, Course CIS732, Dec. 16, 1999. http://eies.njit.edu/-turoff/coursenotes/CIS732/sa. . /brian_732.html. Oct. 8, 2003.
UDRI Researchers Develop Glasses-mounted Display, Next Generation of Wearable Computers, University of Dayton. Feb. 29, 2000. http://www.udayton.edu/news/nr/022900a.html. Accessed on Dec. 5, 2003.
Video glasses come close to melding fantasy, reality, USA Today—Marketplace. http://www.usatoday.com/tech/news/techinnovations/2002-09-23-glasses_x.htm. Accessed on Dec. 5, 2003.
Wave Report, The Wave Report on Digital Media, Nov. 20, 2000. http://www.wave-report.com/2000%Wave%20Issues/wave2055.htm, Accessed on Mar. 17, 2004.
Wearable Computing, Georgia Institute of Technology, 2003. http://www.gatech.edu/innovations/wearablecomputing. Oct. 8, 2003.
Weiss, Peter. "Minding Your Business", Science News Online, Week of May 3, 2003,vol. 16. http://www.sciencenews.org/20030503/bob8.asp. Accessed on Oct. 8, 2003.
Willett, Edward. "Best of Popular Science's What's New: 1999", Edward Willett's Science Columns, 1999. http://www.edwardwillett.com/Columns/popscienceawards99.htm. Accessed on Oct. 8, 2003.
International Search Report and Written Opinion, re PCT Application No. PCT/US2010/021044, issued Apr. 13, 2010 in 9 pages. 16.

\* cited by examiner

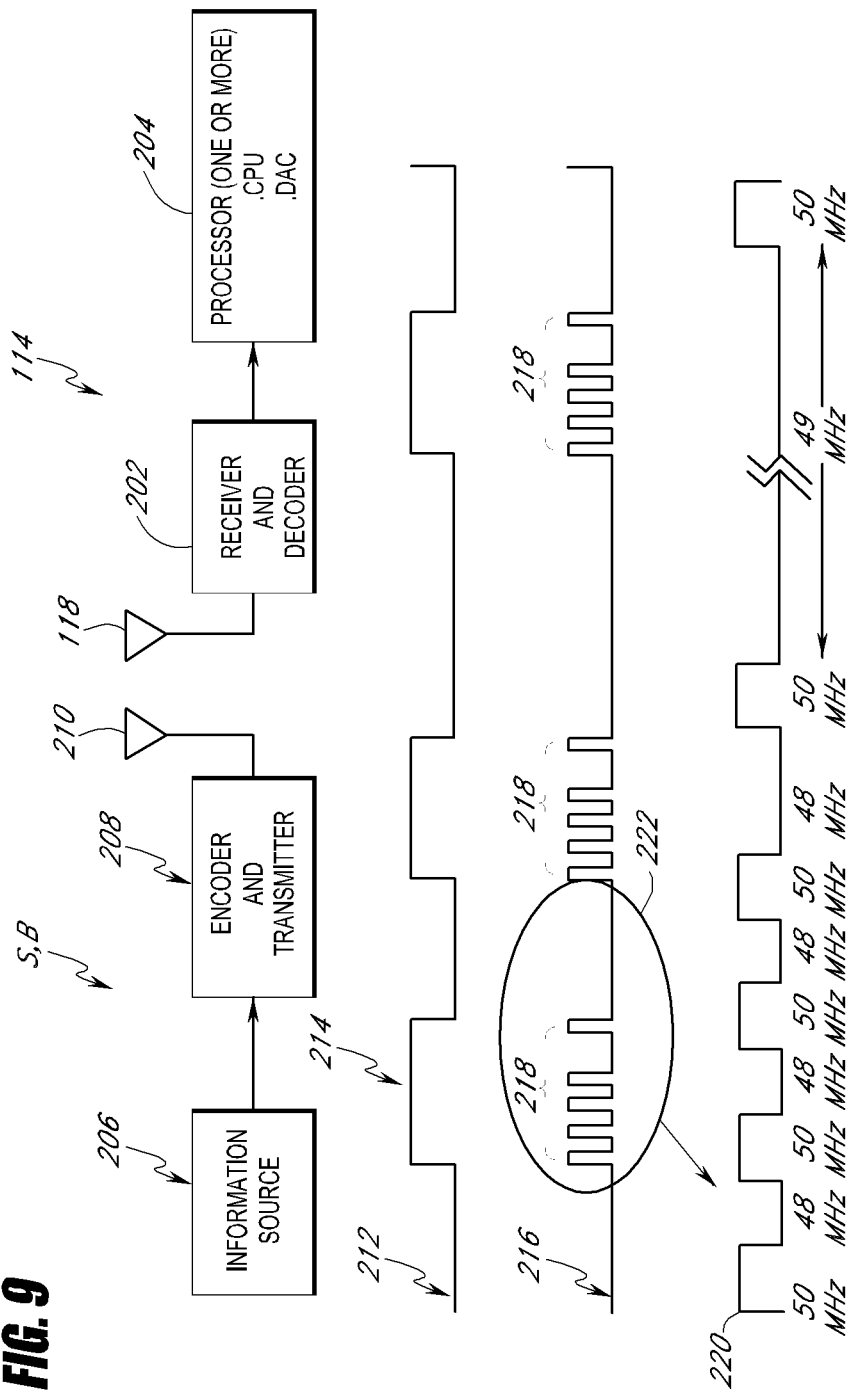

ELECTRONIC ORNAMENTATION FOR EYEWEAR

CROSS-REFERENCE TO RELATED APPLICATIONS

This application is a continuation of International Application No. PCT/US2014/019989, designating the United States, with an international filing date of Mar. 3, 2014, which claims priority to U.S. Provisional Application No. 61/794,727, filed Mar. 15, 2013, the entirety of each which is incorporated herein by reference.

BACKGROUND

Field

The present inventions relate to electronic ornamentation for eyewear, including electronic displays for eyewear frames and ear stems.

SUMMARY

In accordance with one embodiment, an eyewear system includes at least one lens, a support configured to support the at least one lens in a wearer's field of view when worn, and a user-configurable display supported by the support. The user-configurable display is positioned outside of the wearer's field of view when worn.

In some embodiments, the user-configurable display includes an e-paper display.

In some embodiments, the user-configurable display includes a bistable display.

In some embodiments, the user-configurable display is selected from the group consisting of one or more of: an electrophoretic display, an electrowetting display, an electrofluidic display, an interferometric modulator display, a cholesteric liquid crystal display, a bistable display, a photonic crystal display, a reverse emulsion electrophoretic display, and an electrochromic display.

In some embodiments, the user-configurable display is configured to display an image in response to an electrical image signal.

In some embodiments, the eyewear system further includes a data input port configured to receive the electrical image signal.

In some embodiments, the data input port includes a micro-USB port.

In some embodiments, the data input port includes a wireless receiver.

In some embodiments, the user-configurable display is configured to display an image in response to pressure applied to a surface of the user-configurable display.

In some embodiments, the user-configurable display is positioned at least partially within a cavity in the support.

In some embodiments, the user-configurable display is about 1 mm thick.

In some embodiments, the eyewear system further includes a brand name or logo displayed on the user-configurable display.

In accordance with another embodiment, an eyewear system includes at least one lens, a support configured to support the at least one lens in a user's field of view when worn, and an electronically-configurable design element supported by the support, the electronically-configurable design element configured to display a design selected by the user.

In some embodiments, the electronically-configurable design element includes an e-paper display.

In some embodiments, the electronically-configurable design element includes a bistable display.

In some embodiments, the electronically-configurable design element is selected from the group consisting of one or more of: an electrophoretic display, an electrowetting display, an electrofluidic display, an interferometric modulator display, a cholesteric liquid crystal display, a bistable display, a photonic crystal display, a reverse emulsion electrophoretic display, and an electrochromic display.

In some embodiments, the electronically-configurable design element is configured to display an image in response to an electrical image signal.

In some embodiments, the eyewear system further includes a data port configured to receive the electrical image signal.

In some embodiments, the data port comprises a wireless receiver.

In some embodiments, the electronically-configurable design element is configured to display an image in response to pressure applied to a surface of the electronically-configurable design element.

In some embodiments, the electronically-configurable design element is configured to erase the user-selectable design from the electronically-configurable design element when electrical energy is delivered to the design element.

In accordance with yet another embodiment, an eyewear system includes at least one lens, a support configured to support the at least one lens in a user's field of view when worn, and a display supported by the support. Electrical energy used to create a display image on the display is stored outside of the support.

In accordance with yet another embodiment, an eyewear system includes at least one lens, a support configured to support the at least one lens in a user's field of view when worn, and first and second ear stems extending from the lens holder, the first ear stem comprising an inside surface configured to face towards the user's head when worn and an outside surface configured to face away from the user's head when worn, and a display supported by the first ear stem, wherein an outside surface of the display is mounted flush with the outside surface of the first ear stem.

BRIEF DESCRIPTION OF THE DRAWINGS

Embodiments of various inventive features will now be described with reference to the following drawings. Certain comments and descriptions are provided in the drawings by way of examples, but should not be understood to limit the scope of the inventions or to provide the only possible application, structure, or usage for the illustrated example. Throughout the drawings, reference numbers may be re-used to indicate correspondence between referenced elements. The drawings are provided to illustrate example embodiments described herein and are not intended to limit the scope of the disclosure.

FIG. 9 is a schematic illustration of communication hardware which can be incorporated into any of the wearable visual devices of FIGS. 1-8;

FIG. 10 is a schematic representation showing signals used with one embodiment of a communication protocol utilized by the hardware of FIG. 9;

DETAILED DESCRIPTION

Figure 1:
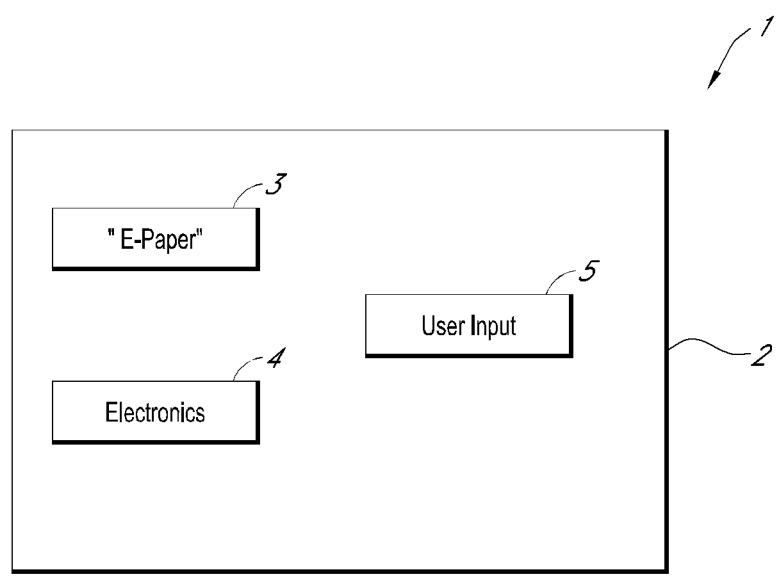
FIG. 1 is a schematic representation of a wearable device having a configurable display.

While the present description sets forth specific details of various embodiments, it will be appreciated that the description is illustrative only and should not be construed in any way as limiting. Additionally, although particular embodiments of the present inventions may be disclosed or shown in the context of unitary or dual lens eyewear systems, such embodiments can be used in both unitary and dual lens eyewear systems. Further, various applications of such embodiments and modifications thereto, which may occur to those who are skilled in the art, are also encompassed by the general concepts described herein. Furthermore, although various embodiments are shown in use with eyewear or eyeglass systems, embodiments can also be used with goggles and other forms of eyewear.

Glasses and sunglasses are often used as a form of personal expression. Users demand not only for frames that allow for personalization in the selection of the frame itself, but also for personalization of frame properties such as color, design, or texture. Consumers are interested in creating frames that are uniquely their own. There is also a demand for a personalization of frames which may be easily changeable without having to purchase another set of frames. There is also a demand by manufacturers to create a logo to promote their brand on the sunglasses, and yet let that logo be changeable.

Electronic paper or "E-Paper" (sometimes referred to as "electronic ink") may be used to display text and images in a variety of applications, particularly in the literary market. E-Paper, generally speaking, includes a display that uses electronic charge to manipulate particles or liquid suspended in a substrate, often times to form words or an image. Unlike backlit flat panel displays, E-Paper displays reflect light like ordinary paper.

E-Paper is a term which encompasses many types of electronic display technologies. E-Paper displays include, but are not limited to electrophoretic, choloresteric liquid crystal, electrowetting, electrochromic, photonic crystal, and reverse emulsion electrophoretic displays. E-Paper may have the property of being bistable, that is, the display does not need a continuous electronic charge or source of energy, voltage, currently, or power, to maintain an image. Many types of E-Paper technologies can maintain text and images indefinitely without using electricity. Such displays only use a very small amount of energy to change or erase images. E-Paper can therefore provide several favorable properties, such as an improved battery life. Often E-Paper is considered to be a "green" technology, that is, E-Paper displays may use low to no amounts of energy and natural resources to maintain an image. E-Paper may also be used as an electronically-configurable design element.

For example, one type of E-Paper display is an electrophoretic display. An electrophoretic display forms visible images by rearranging charged pigment parties using an applied electric field. Particles made of an appropriate material, such as titanium dioxide approximately one micron in diameter are dispersed in an oil. A dye may also be added to the oil along with surfactants and charging agents to cause the titanium dioxide parties to take an electric charge. The mixture may then be placed between two parallel, conductive plates separated by a gap. In some embodiments, the plate spacing, or gap width is the range of from about 10 to about 100 microns. When an electrical potential is applied across the plates, the charged particles migrate to the plate having the opposite charge from that on the particles. When the particles move to the front (image viewing) side of the display it appears white because incident light is scattered back to the viewer by higher index titanium dioxide parties. When the particles move to the rear side of the display, the display appears dark because light is absorbed by the dark-colored dye. By dividing the electrode into a number of small picture elements (sometimes referred to as pixels), an image may be formed by applying the appropriate amount of electrical energy to each region of the display to create a pattern of reflecting and absorbing regions.

E-Paper displays may also include a cholesteric liquid crystal display. One manufacturer of such displays is Kent Displays. Kent Displays's Reflex™ Display incorporates polymer stabilized cholesteric liquid crystals. A cholesteric liquid crystal is a type of liquid crystal with a helical structure. These displays permit image retention with no energy, which results in energy savings in many applications. These displays exhibit superior optical characteristics and maintain optical performance over a wide variety of viewing angles. Brightness and contrast are also high in such displays. Another advantage is that the display can be read in direct sunlight. The choloesteric liquid crystal display only requires power to change or erase an image, which can be provided by a small battery or even a solar cell. No energy is required to maintain the image once it is displayed. Cholesteric liquid crystal displays are able to produce an image from reflected light. The E-Paper displays are bistable, meaning that they exhibit both a bright reflecting state and a dark non-reflecting state without applying any power. Cholesteric liquid crystal displays may be resistant to humidity, water or solvent contact, extreme temperature, dirt, impact, tears and abrasions. Cholesteric liquid crystal displays may also be thin, having a thickness of at least 60 microns. These displays may exhibit a variety of colors, or they may only exhibit one or two colors. It follows that one may create an eyeglass frame that may be personalized with a medium such as E-Paper.

FIG. 1 shows one block diagram, schematic representation of an embodiment of an E-Paper display system 1. The display system 1 includes a support 2, an E-Paper display 3, electronics 4, and an input 5. The support 1 may include any wearable article, such as an article of clothing, including, but not limited to, glasses, hats, shirts, t-shirts, pants, jackets, and the like.

The E-Paper display 3 may be supported on the head of a human or animal. Thus, the support 2 can be in the form of any known headwear. For example, but without limitation, the support 2 can include a hat, band, sweatband, helmet, earbuds, headphones, earphones, eyeglasses, sunglasses, goggles, a helmet, mask, ski goggles, etc.

In other embodiments, the support 2 is configured to be supported by a portion of a user's body. Thus, the support 2 can include any wearable apparel including, but limited to, short and long sleeve t-shirts, pants, shorts, shoes, socks, outerwear, scarves, gloves, sweatshirts, watches, jackets, backpacks, waistbands, belts, jewelry, and the like.

The support 2 supports the various components of the display system 1. For example, in some embodiments, the display 3 and electronics are mounted inside of a cavity formed within the support 2. The display 3 can include any of the displays described herein, including an E-Paper display. The electronics 4 allow a user to communicate with and configure the image shown on the display 3. In some embodiments, the electronics 4 include a processor or microcontroller. The electronics 4 can include discrete electronic elements, such as a memory, driver, etc. In some embodiments, the electronics 4 include a printed circuit board upon which the display 3 is mounted. In some embodiments, the electronics 4 include a data port to facilitate electronic communication and programming of the display 4. For example, the electronics 4 can include a wired or a wireless interface such as a USB, miniUSB or microUSB port or a radio transmitter, receiver, and/or transceiver. In some embodiments, the electronics 4 include an IEEE 802.15.1 complaint (e.g., BLUETOOTH) wireless radio transceiver that allows the display 3 to be configured from any BLUETOOTH-capable device (e.g., a telephone, a cellphone, a computer, a PDA, a camera, a global positioning system, an MP3 player, a digital audio player, and/or a digital video player, etc.).

Figure 2:
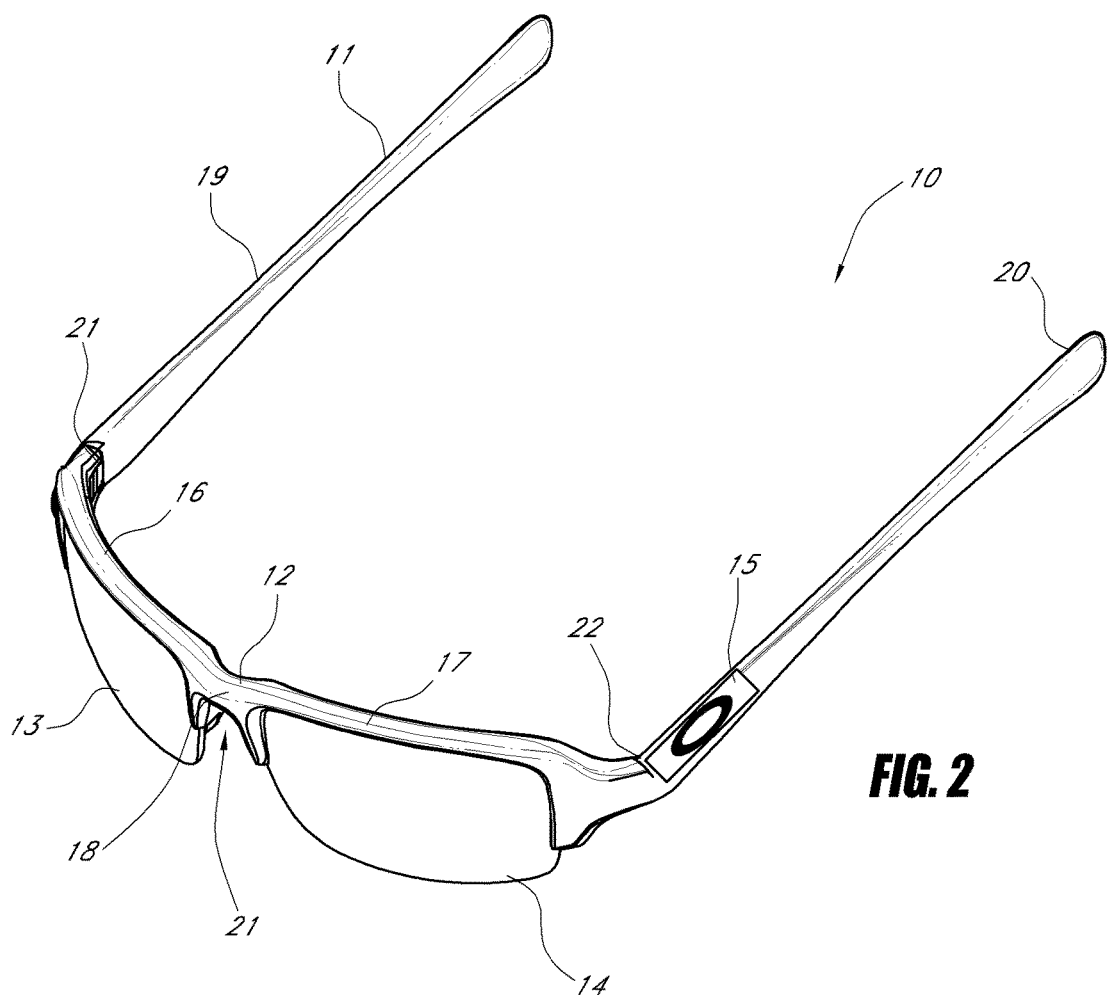
FIG. 2 is a front, left side, top perspective view of one embodiment of the wearable device of FIG. 1.

FIG. 2 shows one embodiment of an E-Paper display system 10. The display system 10 includes a support, which in the illustrated embodiment is in the form of an eyeglass 11. The eyeglass 11 includes a frame 12 which supports right and left lenses 13, 14. Although the present E-Paper display system 10 will be described with reference to a dual lens eyeglass, one of skill in the art should understand that the methods and principles discussed herein are readily applicable to any wearable article, includes eyeglass frames for unitary lens eyeglass systems and goggle systems, as well. Further, in some embodiments, lenses 13, 14 are omitted.

In one embodiment, the lenses 13, 14 are configured to provide variable light attenuation. For example, each of the lenses 13, 14 can include a pair of stacked polarized lenses, with one of the pair being rotatable relative to the other. For example, each lens of the stacked pairs can include an iodine stained polarizing element. By rotating one lens relative to the other, the alignment of the polar directions of the lenses changes, thereby changing the amount of light that can pass through the pair. U.S. Pat. No. 2,237,567 discloses iodine stained polarizers and is hereby expressly incorporated herein by reference. Additionally, rotatable lens designs are disclosed in U.S. Pat. No. 4,149,780, which is hereby expressly incorporated herein by reference.

Alternatively, the lenses 13, 14, can include photochromic compositions that darken in bright light and fade in lower light environments. Such compositions can include, for example, but without limitation, silver, copper, and cadmium halides. Photochromic compounds for lenses are disclosed in U.S. Pat. Nos. 6,312,811, 5,658,502, 4,537,612, each of which are hereby expressly incorporated by reference.

In one embodiment, the lenses 13, 14 include a dichroic dye guest-host device configured to provide variable light attenuation. For example, the lenses 13, 14 can include spaced substrates coated with a conducting layer, an alignment layer, and preferably a passivation layer. Disposed between the substrates is a guest-host solution which includes a host material and a light-absorbing dichroic dye guest. A power circuit (not shown) can be supported by the frame 12. The power circuit is provided with a power supply connected to the conducting layers. Adjustment of the power supply alters the orientation of the host material which in turn alters the orientation of the dichroic dye. Light is absorbed by the dichroic dye, depending upon its orientation, and thus provides variable light attenuation. Such a dichroic dye guest-host device is disclosed in U.S. Pat. No. 6,239,778, which is hereby expressly incorporated by reference.

The frame 12 also includes right and left lens supports 16, 17 for supporting the right and left lenses 13, 14, respectively. Although various embodiments are described in the context of a pair of lens supports 16, 17 which only partially surround the respective lenses 13, 14, the principles of the present disclosure also apply to eyeglass systems in which the frame entirely surrounds the lens or lenses, or contacts only one edge or a portion of one edge of the lens or each lens as well. In the illustrated embodiment, the lens supports 16, 17 are connected by a bridge portion 18.

In addition, an open region 21 is configured to receive the nose of the wearer, as is understood in the art. The open region 21 may optionally be provided with a nose piece, either connected to the lens supports 16, 17, or the bridge 18, or directly to the lenses, depending on the particular embodiment. Alternatively, the nose piece may be formed by appropriately sculpting the medial edges of the lens supports 16, 17 and the lower edge of the bridge 18, as in the illustrated embodiment.

The eyeglass 11 is also provided with a pair of generally rearwardly extending ear stems 19, 20 configured to retain the eyeglass 11 on the head of a wearer. The frame 12 and the ear stems 19, 20 can be made from any appropriate material, including polymers and metals. Preferably, the frame 12 and the ear stems 19, 20 are manufactured from a polymer. The lens supports 16, 17 can be separately formed and assembled later with a separately manufactured bridge 18, or the lens supports 16, 17 and bridge 18 can be integrally molded or cast. When a metal material is used, casting the eyeglass components directly into the final configuration desirably eliminates the need to bend metal parts.

The ear stems 19, 20 are pivotally connected to the frame 12 with hinges 21, 22. Additionally, the ear stems 19, 20 optionally include padded portions near the ear stem ends (not shown). The padded portions can include foam, rubber, or other soft material for enhancing comfort for a wearer. The padded portions are positioned such that when the E-Paper display system 10 is worn by a wearer, the padded portions lie between the side of the user's head and the superior crux and/or upper portion of the helix of the wearer's ears. The ear stems 19, 20 both contain an inside surface, which faces towards a wearer's head when worn, and an outside surface that faces away from the user's head when worn.

The display system 10 also supports an E-Paper display 31. In the illustrated embodiment, the E-Paper display 31 is supported by the left ear stem 20. An image 33 in the form of a logo is shown on E-Paper display 31.

In the illustrated eyeglass system 10, a single display 31 is shown supported by the ear stem 20. However, two or more displays 31 could be supported by either one or both ear stems 19, 20. In other embodiments, one or more displays 31 are supported by other sections of the eyeglass system 10, such as the lens frame 12, lens 13, 14, nosepiece 18, or any other section of the eyeglass system 10. Additionally, an E-Paper display 31 can be supported by any portion of an ear stem 19, 20 including, but not limited to, the portion closest to the frame 12, the portion at the distal end of the ear stem, or any portion of the middle of the ear stem. The display may also be located on or near any portion of the lens support 16, 17. The display may also be incorporated as part of one or both of the lenses 13, 14. In one embodiment, the entire support is a display.

The phrase "supported by" is a broad term having its ordinary meaning and in some embodiments may generally refer to a display contained on or within some portion of the eyeglass system 10. In one embodiment, a display may be embedded in a portion of the eyeglass system. Within another embodiment, the display may be carried by the eyeglass system. Embedded is another broad term having its ordinary meaning and in some embodiments may refer to being co-molded or co-extruded with to form a single piece integrated unit. However, in other embodiments, embedded refers to a cavity, opening or aperture is formed within the eyeglass system, and the display is installed within the cavity, opening, or aperture.

Figure 3:
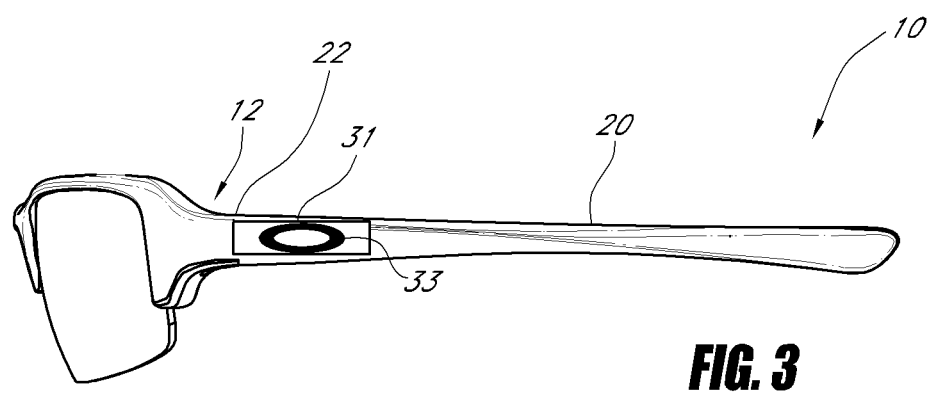
FIG. 3 is a left side view of the embodiment of the wearable device of FIG. 2.

FIG. 3 shows a side view of the E-Paper display system 10 of FIG. 2. FIG. 3 also demonstrates that in at least one configuration, the E-Paper display 31 is viewable to a third party, but not the wearer, when worn. By not being in plain sight of the wearer or in the user's field of view when worn, the images displayed on the E-Paper system's display 31 are not distracting or bothersome to the user. It is also beneficial to position the display 31 outside of the user's field of view when worn to prevent flashing or moving images from distracting the user.

Figure 4A:
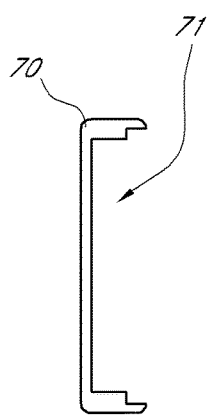
FIGS. 4A-4C are cross-sectional views of the display of the wearable device of FIGS. 2 and 3 showing various stages of assembly.
Figure 4B:
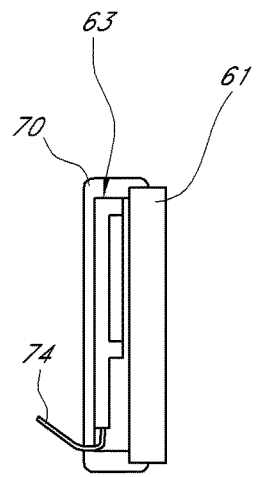
Figure 4C:
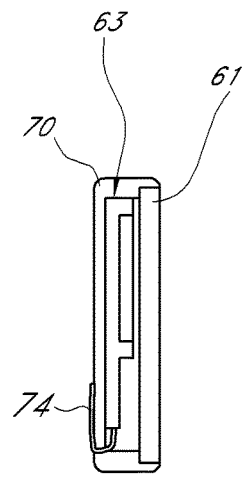

FIGS. 4A-4C illustrate one the display 31 of FIGS. 1 and 2 in various stages of assembly. FIG. 4A shows the display's housing 70. The housing 70 includes a cavity 71 dimensioned to receive the display 31, electronics, and lens 61. According to an embodiment, the cavity 71 may have depth of about 3 mm and a width of about 21 mm. The cavity 71 may include a recess that is about 1 to 2.5 mm deep. The wall thickness of the housing 70 above and below the cavity 71 is about 2 mm.

FIG. 4B shows a display 31 and a lens 61 implanted into the cavity 71. The lens 61 extends about 1 mm beyond the outside surface of the housing 70. The lens 61 is sized to snugly fit within the cavity 71, and therefore may have a width of about 26 mm, a length of about 38 mm, and a thickness of about 2 mm.

A wire or ribbon cable 74 may extend from the display 31 and attach to an electronics circuit. The electronics circuit may be used to control, program, clear, and otherwise operate or configure the display 31.

As shown in FIG. 4C, the thickness of the lens 61 may be reduced via a heating, grinding or a slicing technique to be substantially flush or flush with the housing 70 face.

The housing 70 cavity 71 is configured to receive the E-Paper display 31 as well as other optional electronics when provided. For example, in some embodiments, the internal cavity is sized to receive electronics on a printed circuit board (not shown). In some embodiments, the electronics also include one or more switches and/or buttons. The switches and buttons allow the user to directly load, select, modify, and/or configure the message and/or image shown on the display 31 without having to couple the system 10 to a programming device (not shown). In other embodiments, the user is able to configure the message and/or image shown on the display 31 by communicating with an external programmer via a data port. For example, in some embodiments, the display 31 is configured by receiving an image file, signal, or instruction from a computer, the Internet, a cell phone, a BLUETOOTH enabled device, a camera, an RFID beacon, a network access point, etc. Additionally, the printed circuit board can include a memory and a display driver.

The display 31 can be configured to store and display any of a variety of electronic text and/or image files. In the illustrated embodiment, the eyeglass system 10 includes a memory and a processor. The memory and the processor are configured to operate together to function as a visual storage and display system. Suitable electronics for enabling and displaying E-Paper image storage and display are commercially available from E-Ink, SiPix, Kent Displays, and Zikon.

As discussed above, the printed circuit board also includes or is in electrical communication with a data transfer port. In some embodiments, the data port includes any of the wired or wireless devices described herein. In one embodiment, in the housing 70 cavity includes an aperture that is aligned with the data transfer port. Thus, when the printed circuit board is received in the internal cavity, the data transfer port is aligned with the aperture.

A door may be provided to open and close the aperture through which the data port is exposed and protect the data port from dust, dirt, moisture, rain, etc. Preferably, the door is hinged to the housing 70. In one embodiment, the door can be pivoted relative to housing 70, thereby exposing the data transfer port. The data transfer port may be configured to operate according to the universal serial bus (USB) transfer protocol. According to some embodiments a micro-USB transfer protocol is used. Optical data ports may alternatively be used. As a further alternative, E-Paper image files or signals may be uploaded from a source using wireless systems, such as BLUETOOTH® protocols, as is discussed below. Further, the system 10 is configured to receive electrical image files or signals from another computer, through the data transfer port and to store the files into the memory incorporated into the device.

According to an unillustrated embodiment, the cavity may be open on the top and side of an ear stem. In such an embodiment, the cavity would open on the side and top of the ear stem. In yet another embodiment, the cavity may be open over the bottom and the side of the ear stem. In yet another embodiment, the cavity may be open over both the bottom and the top of the ear stem. Additional methods, such as applying a suitable adhesive may be utilized to ensure effective adhesion of the display into the cavity.

Figure 2B:
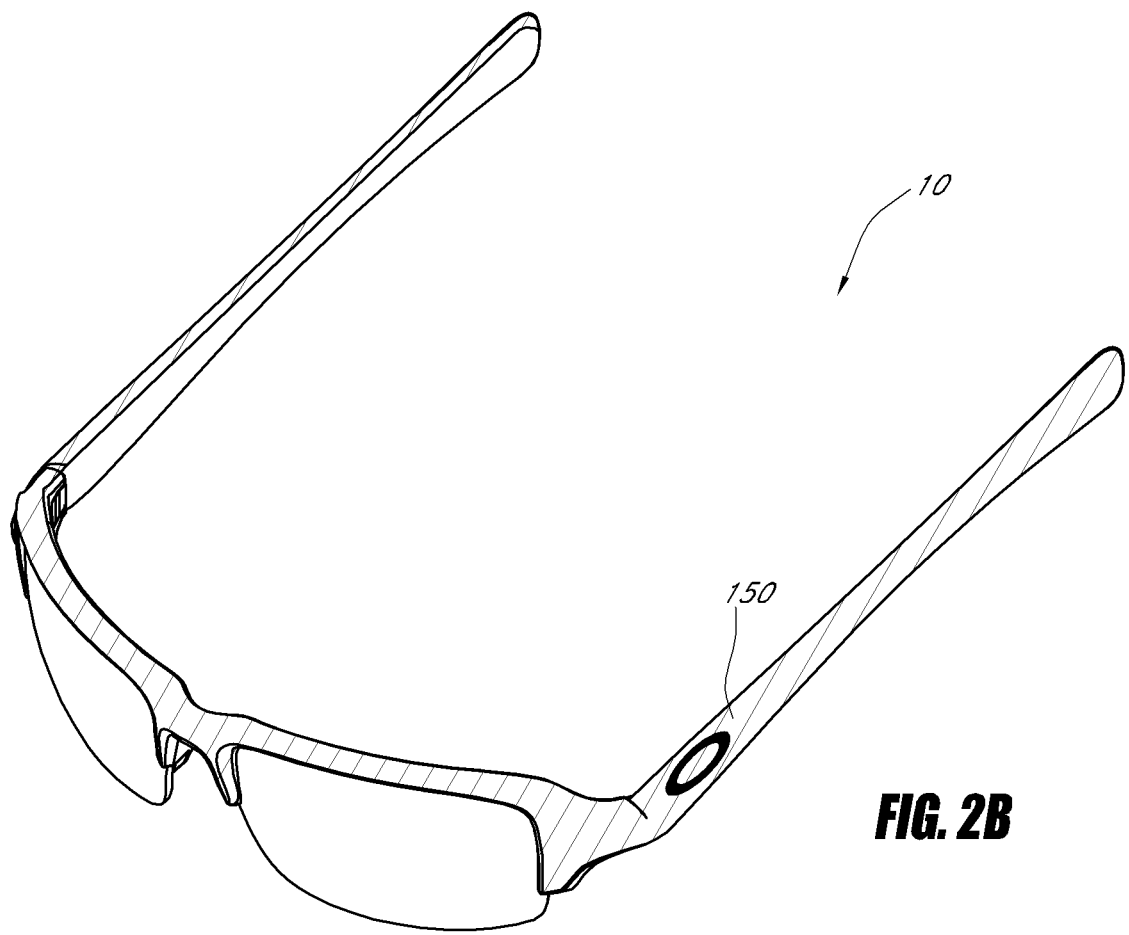
FIG. 2B illustrates another embodiment of a wearable device having multiple configurable display portions.

In another embodiment, as shown in FIG. 2B the entire outwardly facing portion of the glasses system 10 includes a display 150. In this embodiment, the outwardly facing portions of the ear stems, right orbital support, nosepiece, and left orbital support may all include a single E-Paper display. In such embodiments where the entire outwardly facing portion is includes an E-Paper display, the display may be formed of three separate displays: one for each ear stem and one for the right and left orbital supports.

Figure 5A:
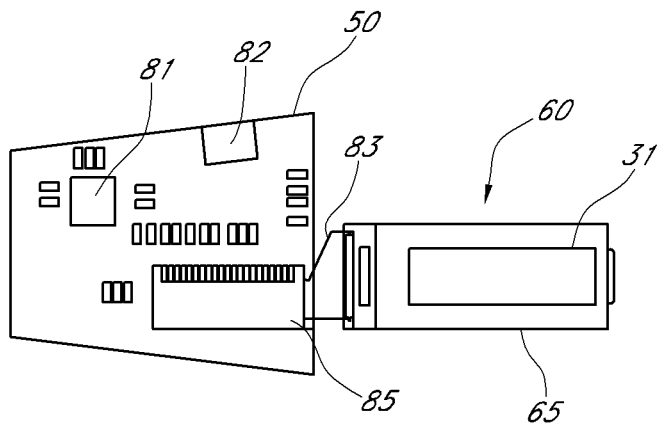
FIG. 5A is a schematic, front view of one embodiment of the display and electronic circuitry of the wearable device of FIGS. 2-4.

FIG. 5A shows one embodiment of electronic circuitry 50 and display assembly 60 suitable for use with any of the systems described herein. In this embodiment, electrical circuitry 50 includes a microcontroller 81 and a micro-USB data port 82. The data port 82 is configured to receive an image file or a signal instructing the microcontroller 81 to select an image from a memory. In other embodiments, the data port 81 includes a wireless device, such as a wireless radio receiver, transmitter, or transceiver, as discussed above. The display assembly 60 is attached to an electronics module 50 via a ribbon cable 83. The electronics module 50 includes the microcontroller 81, the data port 82 and a connector 85 to receive the ribbon cable 83.

Other electronics suitable for use with any of the embodiments described herein are described in U.S. Publication No. 2006/0132382, filed as U.S. patent application Ser. No. 11/022,367 on Dec. 22, 2004 and entitled "DATA INPUT MANAGEMENT SYSTEM FOR WEARABLE ELECTRONICALLY ENABLED INTERFACE and U.S. Pat. No. 7,682,018, filed as U.S. patent application Ser. No. 12/331, 327 on Dec. 9, 2008 and entitled "EYEGLASSES WITH DETACHABLE, ADJUSTABLE ELECTRONICS MODULE," which are both hereby incorporated by reference in their entireties.

According to one embodiment, the E-Paper display assembly 60 includes or displays one or more of a variety of colors on display 31. In some embodiments the e-ink or displaying particles creating the image in the E-Paper include a single color, a variety of colors, or black and white. The display may include a (see FIG. 6) lens 61 or other transparent cover, which may be clear and colorless. In other embodiments the lens 61 or transparent cover has a colored tint. The resolution of the display 60 may vary. In one embodiment, the resolution of the display 60 is 128×32 pixels. The dimensions of the display 60 may be about 33 mm wide, about 20 mm long, and about 1.7 mm thick. The display may display text and images in a monochrome color. The monochrome color combinations of the image and background may be white/white, yellow/black, or yellow/red.

Figure 5B:
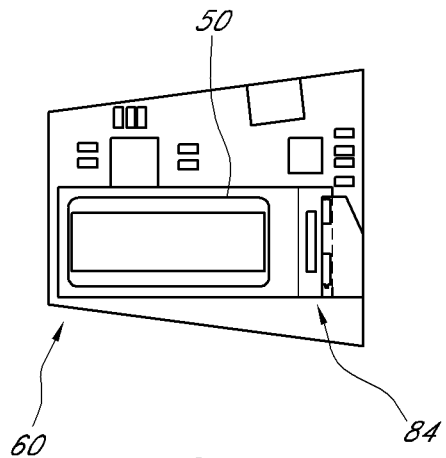
FIG. 5B is another schematic, front view of the embodiment of the display and electronic circuitry of the wearable device of FIG. 5A, where the display ribbon cable has been folded.

FIG. 5B shows the same embodiment where the display assembly 60 is folded up into folded-up display module 84. The folded-up display module 84 includes the electronics module 50 and the display assembly 60. The folded-up display module 84 may then be inserted into a cavity in the eyewear frame housing 70 via the appropriate methods described herein.

Figure 6:
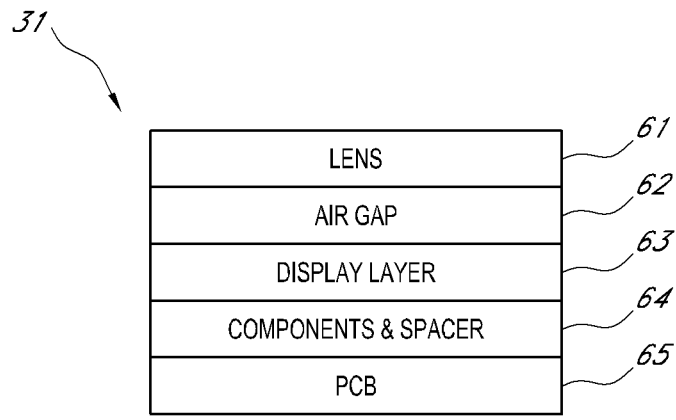
FIG. 6 is a schematic, side view of an embodiment of the electronic display of FIGS. 5A and 5B.

FIG. 6 shows a side view of the layers of an embodiment of an electronic display 31. The layers of the display 60 include a lens layer 61 as an outside surface layer. Adjacent the lens layer 61 is an air gap layer 62. Adjacent the air gap layer 62 is a display layer 63. Adjacent the display layer 63 is a component and spacer layer 64. Adjacent the component and spacer layer 64 is a printed circuit board layer 65. The total thickness of these layers may vary. According to some embodiments, the total thickness of all layers together may be 4 mm or less. According to other embodiments, the total thickness of all layers may be 4.5 mm or less, 3.5 mm or less, 3.0 mm or less, or 2.5 mm or less.

The lens layer 61 may include any type of material with sufficient transparency to allow the display layer 63 to be seen and protected from scratches, contaminants such as dirt, dust or water. Such materials may include a glass or clear plastic material. The lens layer 61 may be made of a shatterproof material such that it will not fracture when subject to an impact force common in the daily use of a pair of eyeglasses. According to one embodiment, the lens layer 61 may be 0.5 mm thick or less. According to another embodiment, the lens layer 61 may be 0.25 mm thick or less.

The air gap layer 62 provides a layer of space between the lens layer 62 and the display layer 62. This layer may vary in depth, or may be eliminated all together. The air gap layer 62 may be 0.5 mm or less. According to another embodiment, the air gap layer 62 may measure 0.25 mm or less. The air gap layer 62 can help protect and insulate the display layer 63 from mechanical force incident upon the lens layer 61.

The display layer 63 displays the information visible to the user. The display layer's material and thickness depend on the particular display technology being used. According to one embodiment, the thickness of the display layer 63 is about 1.5 mm or less. According to another embodiment, the thickness of the display layer 63 is about 1.0 mm or less.

The component and spacer layer 64 includes some of the electrical components used to drive the display. According to one embodiment, the thickness of the component and spacer layer 64 is about 1.25 mm or less. According to another embodiment, the thickness of the component and spacer layer 64 is about 1 mm or less.

The printed circuit board layer 65 includes the printed circuit board upon which the circuitry that controls the operation of the display is mounted. According to one embodiment, the thickness of the printed circuit board layer 65 is about 0.50 mm or less. According to another embodiment, the thickness of the printed circuit board layer 65 is about 0.25 mm or less. The printed circuit board layer 65 may have a rectangular or tapered shape, such as a triangular or trapezoidal shape, or a shape customized to match and fit within the shape of a corresponding cavity within the eyeglass.

One method of displaying an image on an E-Paper display on an eyeglasses stem is described as follows. An image may be selected on a computing device by a user. The image then may be transmitted to a connection port in an eyeglasses system including an E-Paper display. The image may be transmitted by transmitting the image from the computing device to a dock. The eyeglasses system may be connected to the dock via a connection port. The image is then transmitted via through the dock and through the connection port to the E-Paper display where it is then displayed and viewable by a user. The dock and the connection port may be electrically connected. In another embodiment the image may be transferred from the computing device to a storage device over a wired connection, such as a micro-USB. In this embodiment, the eyeglasses system may have a port for the storage device such as a micro-USB port. After a micro-USB cable is connected to the micro-USB port, the image is transferred to the E-Paper display system, and becomes viewable on the display. According to some embodiments this transfer takes place with a charge of electricity from a docking system or a battery electrically connected to the E-Paper display system. The image may be erased or changed by emitting an electrical charge or uploading a new image as described above. In some embodiments, an electrical energy source is stored outside of the frame. In other embodiments, an electrical energy source is stored inside of the frame in a form such as a battery.

According to another embodiment, the image may be wirelessly transmitted from the wearer to another receiving unit, such as another computing device, mobile device, or even another wearable display system. The transmittal of the image file wirelessly and receiving of the image by the receiving unit may occur directly, or the image file may be transmitted via an intermediary, such as a server, or over a network. The intermediary and/or network may require either the user transmitting the image, the recipient, or both, to enter an identification code or pay a fee in order to transmit and/or receive the image. In some embodiments, the user is authorized to send and/or receive image files by purchasing a subscription to such a service over a limited or indefinite time period.

Images transferred to the E-Paper display may be able to be maintained in the E-Paper display for an indefinite period of time without use of additional power. According to other embodiments the image may be maintained for a period of days, weeks, months, or years. Graphic images may be able to be duplicated or shared, and/or they may be able to be refreshed if damaged. The image may include a brand, logo or any other suitable design.

According to another embodiment, an image may be impressed onto an E-Paper display through pressure. In this embodiment, there may be no lens and/or air cap layer or those layers may be very thin. Pressure is applied to the E-Paper display through a pressure device such as a stylus, a writing tool, or a user's hand. The pressure may result in an impression on the E-Paper corresponding to the placement and/or amount of pressure being applied to the display. The image from the impression may be erased through an electrical charge submitted via a dock or battery. This allows for a customizable design on the E-Paper display. Because of the bi-stable property of the E-Paper, it will maintain the impressed image indefinitely, until a charge is applied. According to other embodiments the image may be maintained for a period of days, weeks, or months.

In one embodiment, the E-Paper display incorporates a "tattoo effect" where the image impressed on the display through pressure is able to be maintained on the display for an indefinite amount of time. However, through the use of an electric charge, the "tattoo" may be able to be erased. In one embodiment, the E-Paper is a cholesteric liquid crystal display may include a board that functions as a single pixel for a graphic display. When energy is applied to the board, the board returns to black. The thickness of the display may be approximately 0.3 mm and it may be flexible. Is other embodiments, the display may be rigid. Hardware incorporated in the board may, in some embodiments, include a battery such as a lithium battery having power storage of 150 mAh. The battery may have a recharge rating of up to about 50,000 refresh times. In such an embodiment, the user may be able to make "freehand" drawings on the display for unique personalization. The display then would not need to be connected to a computer dock or other source to receive images. In some embodiments, the display is electrically connected to an external device to receive enough energy to erase, clear or refresh the display screen.

Figure 7A:
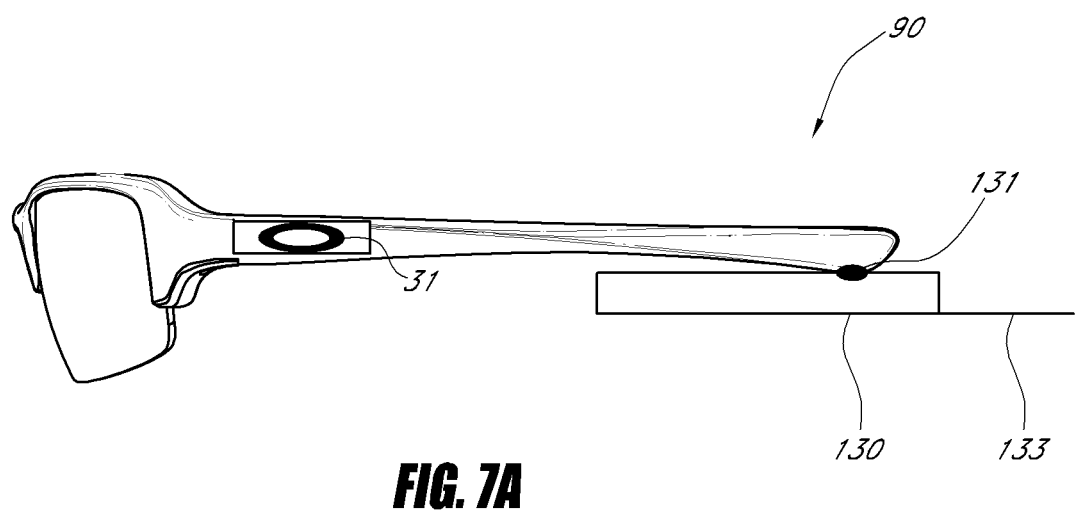
FIG. 7A is a left side view of an embodiment of a wearable device coupled to a docking station.

FIG. 7A illustrates a docking station 130 supporting an eyeglass frame 90 containing an E-Paper display 31. In the illustrated embodiment, electrical contact 131 is located on the frame 90 that connects electrically to the docking station 130. The electrical contact 131 is electrically connected to the E-Paper display 31 via at least one wire located within the ear stem of the frame (not shown). In some embodiments two electrical contacts are provided, for example, one in each support arm of the frame. The contact 131 located within the frame 90 can be used to establish a communication link between the frame's display and control circuitry and a remotely located programming device and power source. For example, a communication link can be formed by bringing the contact 131 on the frame 90 into contact with a contact located on a docking station 130. A wire or cable (or wireless link) can provide a communication link between the docking station 130 and a remote device, such as a programming device, power source, computer, telephone, etc. When the contact 131 is in contact with the docking station 130, the display 31 can receive images and/or data electronically from the remote programmer PC. In some embodiments, the contact on the frame is also able to transmit images and/or data from the display 31 to a remote device.

Figure 7B:
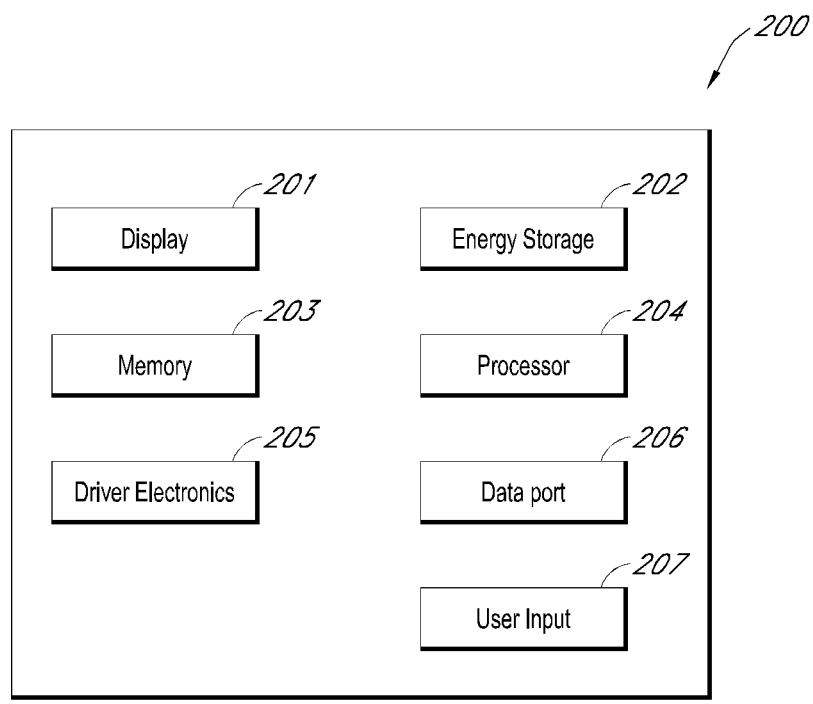
FIG. 7B is a schematic block diagram of another embodiment of a wearable device having a configurable display.

As shown in FIG. 7B, in one embodiment, an eyewear system 200 includes a display 201, an energy storage (e.g., a battery, capacitor, etc.) 202, a memory 203, a processor (e.g. a microcontroller) 204, driver electronics to drive the display 205, a data port 206, and a user input (e.g. one or more buttons, switches, etc.) 207. The system 200 may be able to store multiple image files for display on the display 201. The user may select the image file they would like to display on the display 201 by using the user input 207. The eyewear 200 may also be configured to automatically change the image to create the effect of a moving image, an animation, spiraling helix, rolling wave, and the like. Image animation, slide shows, movements, etc., may be controlled, e.g., started or stopped, by using the user input 207, as well.

Figure 7C:
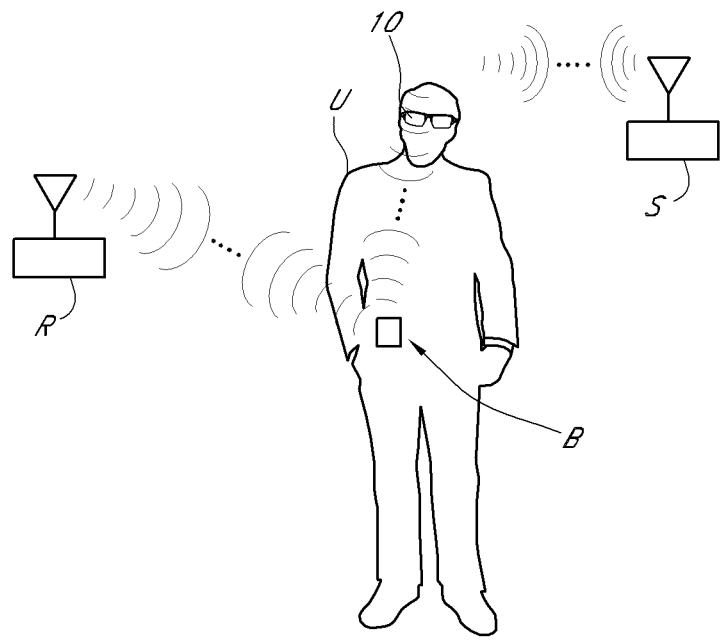
FIG. 7C is a schematic representation of a further embodiment of any of the display devices described herein worn by a user and interacting with source electronics.

In some embodiments, the image to be displayed on the eyewear display system 200 is provided by an external, sometimes "body borne" source. For example, as shown in FIG. 7C, a user U can carry a "body borne" source device B on his person. Body borne sources B include without limitation, a cellular phone, an MP3 player, a "two-way" radio, a palmtop computer, or a laptop computer. As such, the user U can use the display 90 to receive and view visual signals from the source device B, and/or transmit visual signals to the source device B. Optionally, the display device 90 can also be configured to transmit and receive data signals to and from the source device B, described in greater detail below.

Optionally, the device B can also be configured to communicate, via long or short range wireless networking protocols, with a remote source R. The remote source R can be, for example, but without limitation, a cellular phone service provider, a satellite radio provider, or a wireless internet service provider. For example, but without limitation, the source device B can be configured to communicate with other wireless data networks such as via, for example, but without limitation, long-range packet-switched network protocols including PCS, GSM, G3, G4 and GPRS. As such, the display 90 can be used as a visual interface for the source device B.

Providing source electronics B, S, R, external and separated from the system 10 enables the system 10 to accomplish complex electronic functions while retaining a sleek, low weight configuration. The off board source device B may be located anywhere within the working range of the display device 90. In many applications, the source electronics B will be carried by the wearer, such as on a belt clip, pocket, purse, backpack, integrated with "smart" clothing, or the like. This accomplishes the function of off loading the bulk and weight of the source electronics from the headset.

The source electronics B may also be located within a short range of the wearer, such as within the room or same building. For example, personnel in an office building or factory may remain in contact with each, and with the cellular telephone system, internet or the like by positioning transmitter/receiver antenna for the off board electronics B throughout the hallways or rooms of the building. In shorter range, or personal applications, the out board electronics B may be the form of a desktop unit, or other device adapted for positioning within relatively short (e.g. no greater than about 10 feet, no greater than about 20 feet, no greater than about 50 feet, no greater than 100 feet) of the user during the normal use activities.

In all of the foregoing embodiments, the off board electronics B may communicate remotely with a remote source R, as well as with the display system 10. Source R may be the cellular telephone network, or other remote source. In this manner, the electronic image and/or text information to be displayed on the display system 10 may be obtained wirelessly from a remote location. By providing the long-range wireless radio within the body borne device B, the display system 10 is able to achieve a reduced bulk, weight and power consumption profile. The headset communicates with remote source R, via the off board electronics B.

Optionally, the display system 10 can be configured to provide one or two-way communication with a stationary source device S, as well. The stationary source device can be, for example, but without limitation, a cellular phone, a computer, or a local area network.

Any of the wearable display systems described herein can optionally include a power source. The power source can be in the form of a disposable or rechargeable battery. Optionally, the power source can be in the form of a solar panel and a power regulator. According to some embodiments the power source is provided as part of a docking station or the like. In some embodiments, the power source includes a small battery or a capacitor to store the low amount of energy used to configure the image on the system's the electronic display.

As discussed above, the display system's data port can include a wireless radio, such as a receiver, transmitter, or transceiver. Such a data port can be in the form of a digital wireless transceiver for one-way or two-way communication. For example, the data port can be a transceiver used in known wireless networking devices that operate under the IEEE standards of 802.11a, b, g and/or n, as well as 802.15, including 802.15.1, and all versions known as BLUETOOTH™.

The BLUETOOTH™ standard advantageously provides low-cost, low-power, and wireless links using a short-range, radio-based technology. Systems that employ the BLUETOOTH™ standard and similar systems advantageously allow creation of a short-range, wireless "personal area network" by using small radio transmitters. Consequently, with BLUETOOTH™-enabled systems and similar systems, components within these systems may communicate wirelessly via a personal area network. Personal area networks advantageously may include voice/data, may include voice over data, may include digital and analog communication, and may provide wireless connectivity to source electronics. Personal area networks may advantageously have a range of about 30 feet; however, longer or shorter ranges are possible. When the data port includes a wireless radio, an antenna may also be provided to increase the data port's communication range. The antenna can be in the form of an onboard antenna integral with the data port, or an antenna external to the data port. In some implementations, the data port can support data transfer speeds of up to 721 kilo-bits per second.

In one embodiment, the data port includes a receiver or transceiver. In such embodiments, the data port may receive input from a remote source such as a stationary source S or a remote source R.

In one implementation, the data port can operate at least two power levels: a lower power level that covers a range of about ten yards and a higher power level. The higher level covers a range of about one hundred yards, can function even in very noisy radio environments, and can be audible under severe conditions. The data port can advantageously limit its output with reference to system requirements. For example, without limitation, if the source electronics B is only a short distance from display system 10, the data port modifies its signal to be suitable for the distance. In another implementation, the data port can switch to a low-power mode when traffic volume becomes low or stops.

In one arrangement, the dataport and the antenna are disposed in the left ear stem and a battery is disposed in the right ear stem or vice versa. This arrangement is advantageous because distributing the components between the ear stems helps balance the system 10 and provides a more comfortable user experience.

Figure 8:
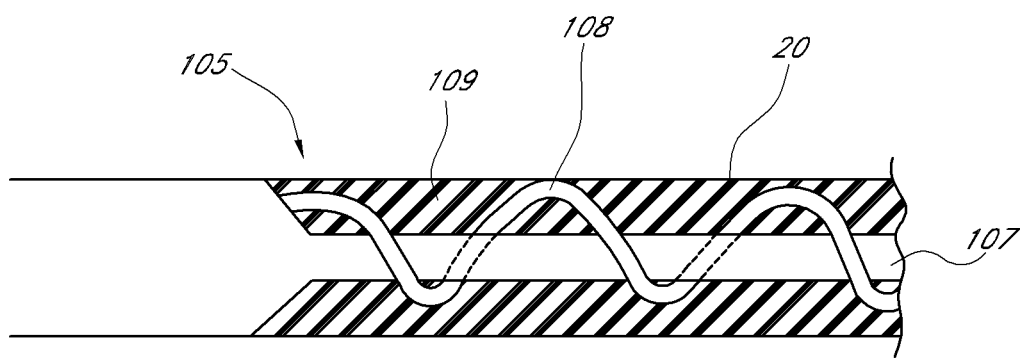
FIG. 8 is a schematic representation of a partial cross sectional view of an ear stem showing an antenna positioned therein.

As discussed above, when the data port includes a radio, such as a transceiver, an antenna may be provided to increase it communication range. Referring to FIG. 8, the appropriate length of the antenna 105 is determined by the working frequency range of the transceiver. Typically, the antenna 105 is approximately 0.25 of the wave length of the signal being transmitted and/or received. In one illustrative non-limiting embodiment, such as in the BLUETOOTH™ standard, the frequency range is from about 2.0 gigahertz to 2.43 gigahertz. For such a frequency range, an antenna can be made with a length of approximately 0.25 of the wavelength. Thus, for this frequency range, the antenna can be approximately 1 inch long.

The antenna can be formed at or near a terminal end of one of the ear stems 19, 20. In the illustrated embodiment, the antenna 105 is disposed at the terminal end of the left ear stem 20. The antenna 105 is generally made from a conductive metal. The antenna can be connected to the transceiver with a direct electrical connection, an inductive connection, or a capacitive connection. An inductive connection is illustrated in the embodiment of FIG. 8. The antenna 105 includes an inner conductive rod 107 and a coil 108 wrapped helically around the rod 107.

In some embodiments, the ear stems themselves are made from a conductive metal material. Where metal is used, near the terminal end of the ear stem, the metal material is reduced relative to the outer surface of the stem 106. The coil member is wrapped around the rod 107 and an insulative material 109 is disposed over the coil 108 so as to be substantially flush with the remainder of the ear stem. Thus, the smooth outer appearance of the ear stem is maintained, without reducing the efficiency of the antenna 105. According to another embodiment at least a portion of ear stems may be made of a polymer.

In some embodiments, the display system 10 includes one or more user activatable controls. For example, the controls can include one or more buttons and/or switches. In one embodiment, the controls include a 3-way button. The 3-way button is configured to have three modes of operation. Firstly, the button is mounted to pivot about a rocker axis. Thus, in one mode of operation, the button can be depressed inwardly on a forward end of the button, thereby causing the button to pivot or "rock" about the pivot axis. Additionally, the button can be pressed at a rearward end, thereby causing the button to pivot about the pivot axis in the opposite direction. Additionally, the button can be mounted so as to be translatable in the medial-lateral direction. Appropriate springs can be provided beneath the button to bias the button in an outward protruding and balanced position. Appropriate contacts can be mounted beneath the button so as to be activated individually according to the modes of operation.

In one illustrative and non-limiting embodiment, the button can be used to control the image visible on the display 31. For example, by pressing on the forward portion, a contact can be made causing the display 31 to change a first image to a second image. Additionally, by pressing on the rearward portion of the button, the display could change from the second image back to the first image.

In a further illustrative and non-limiting example, the medial-lateral movement of the button, can be used to choose different functions performed by display 31. For example, an inward movement of the button could be used to clear an image from the display 31.

The display system 10 can also include electrical contacts for recharging any rechargeable batteries carried by the system 10, or receive display configuration information and/or programming from an external device. In one embodiment, the electrical contacts are disposed on a lower edge of the frame 12. Thus, with an appropriate recharging cradle (not shown), the display system 10 can be laid on the cradle, thereby making contact between the electrical contacts and corresponding contacts in the cradle (not shown). Alternatively, electrical contacts can be provided in numerous other locations as desired. For example, the electrical contacts can be disposed at the ends of the ear stems 19, 20. A corresponding cradle can include two vertically oriented holes into which the ear stems are inserted. In this configuration, the lenses would face directly upwardly.

In another alternative, the electrical contacts are disposed on the upper edges of the lens supports 16, 17. In this configuration, the display system 10 is laid in a cradle in an inverted position, such that the contacts make electrical contact with corresponding contacts in the cradle.

In yet another alternative embodiment, the cradle is electronically attached to a computing device or data storage unit. The electrical contacts are also configured to accept data, and are electrically connected to the display 31. Thus, by placing the power contacts in the data cradle, information such as new images can be transferred to or from the display system 10 through the electrical contacts. In some embodiments the electrical contacts allow for charging and the exchange of data with a data cradle. In other embodiments, the electrical contacts may only allow the exchange of data and do not charge any batteries.

In another embodiment, the display system 10 is advantageously adapted to support any of a variety of portable electronic circuitry or devices which have previously been difficult to incorporate into conventional headsets due to bulk, weight or other considerations. For example, but without limitation, the electronics can include digital or other storage devices and retrieval circuitry such as for retrieving images or other information from format memory or other memory devices. The display system 10 can carry any of a variety of receivers and/or transmitters, as discussed above. For example, but without limitation, the display system 10 can carry receivers and/or transmitters for imaging. In another example, the display system 10 can carry receivers and/or transmitters for telecommunications (e.g., a telecommunications device). As used herein, the term "telecommunications device" is intended to include telephone components as well as devices for communicating with a telephone. For example, "telecommunications device" can include one or more transceivers for transmitting a signal to a cellular phone to be transmitted by the cellular phone. Of course, other audio, video, or data signals can be transmitted between the display system 10 and such a cellular phone through such transceivers.

In other embodiments, drivers and other electronics for driving heads-up displays, such as liquid crystal displays or other miniature display technology can also be carried by the display system 10. When such additional displays are provided, the system 10 may include a power source, as well. The power source can advantageously be replaceable or rechargeable. Other electronics or mechanical components can additionally be carried by the display system 10. In other embodiments, the display system 10 can also be utilized to support any of the foregoing or other electronics components or systems, without also supporting one or more lenses in the wearer's field of view. Thus, in any of the embodiments of the visual devices disclosed herein, the lenses and/or lens supports can be omitted as will be apparent to those of skill in the art in view of the disclosure herein.

In another embodiment, the data port is adapted to employ a wide variety of technologies, including wireless communication such as RF, IR, ultrasonic, laser or optical, as well as wired and other communications technologies. In one embodiment, a body-LAN radio is employed. Other embodiments can employ a flexible-circuit design. Many commercially available devices can be used as a data port. For example, without limitation, Texas Instruments, National Semiconductor, Motorola manufacture and develop single RF transceiver chips, which can use, for example, 0.18 micron, 1.8 V power technologies and 2.4 GHz transmission capabilities. Of course, a variety of transceiver specifications are available and usable, depending on the particular embodiment envisioned. In another implementation, other commercially available products operating at 900 MHz to 1.9 GHz or more can be used. Data rates for information transfer to wearable or other type computing devices will vary with each possible design. In a preferred implementation, a data rate is sufficient for text display. RF products, and other products, ultimately will be capable of updating a full-color display and have additional capabilities as well. Thus, heads-up displays, such as liquid crystal displays or other miniature display technology described above can be employed.

With reference to FIGS. 9 and 10, a communication protocol between the source device S, B and a transceiver 114 is described. In this embodiment, the transceiver 114 is configured for one-way communication. The transceiver includes a receiver and decoder 202 and a processor 204 (which can include one or more of a CPU and a digital-to-analog converter, or DAC).

For purposes of illustration, the source device S, B will be configured only to transmit a signal to the transceiver 114. Thus, in this embodiment, the source device S, B includes an E-Paper image data source 206 (e.g., one or more of a cellular telephone, an mp3 player, and/or a computer, or any other such source, as describe above) and an encoder and transmitter 208. An antenna 210 is illustrated schematically and is connected to the encoder and transmitter 208. As an illustrative example, the transmitter 208 outputs a signal at 128 kbps (NRZ data). However, other data rates can be used. The encoder and transmitter 208 is configured to encode the 128 kbps signal from the information source 206 and to transmit it through the antenna 210. For example, the encoder and transmitter 208 can be configured to transmit the encoded signal on a carrier signal centered on 49 MHz.

The receiver and decoder 202 can be configured to receive the carrier signal of 49 MHz through an antenna 118, decode the digital signal, and transmit the digital signal to the processor 204. The processor 204 can be connected to the E-Paper display (not shown) and thereby provide a visual output to the user.

With reference to FIG. 10, the 128 kbps signal from the data source 206 is identified by the reference numeral 212. In one embodiment, the encoder and transmitter 208 can be configured to encode the signal 212 from the data source 206. The encoded signal from the encoder and transmitter 208 is identified by reference numeral 216. The encoder and transmitter 208 can be configured to encode each pulse 214 of the signal 212 into a pattern of pulses, one pattern being identified by the reference numeral 218.

In the lower portion of FIG. 10, signal 220 represents an enlarged illustration of the portion of the signal 216 identified by a circle 222. As shown in FIG. 10, the pattern 218 may include a series of 50 MHz and 48 MHz signals.

Figure 11:
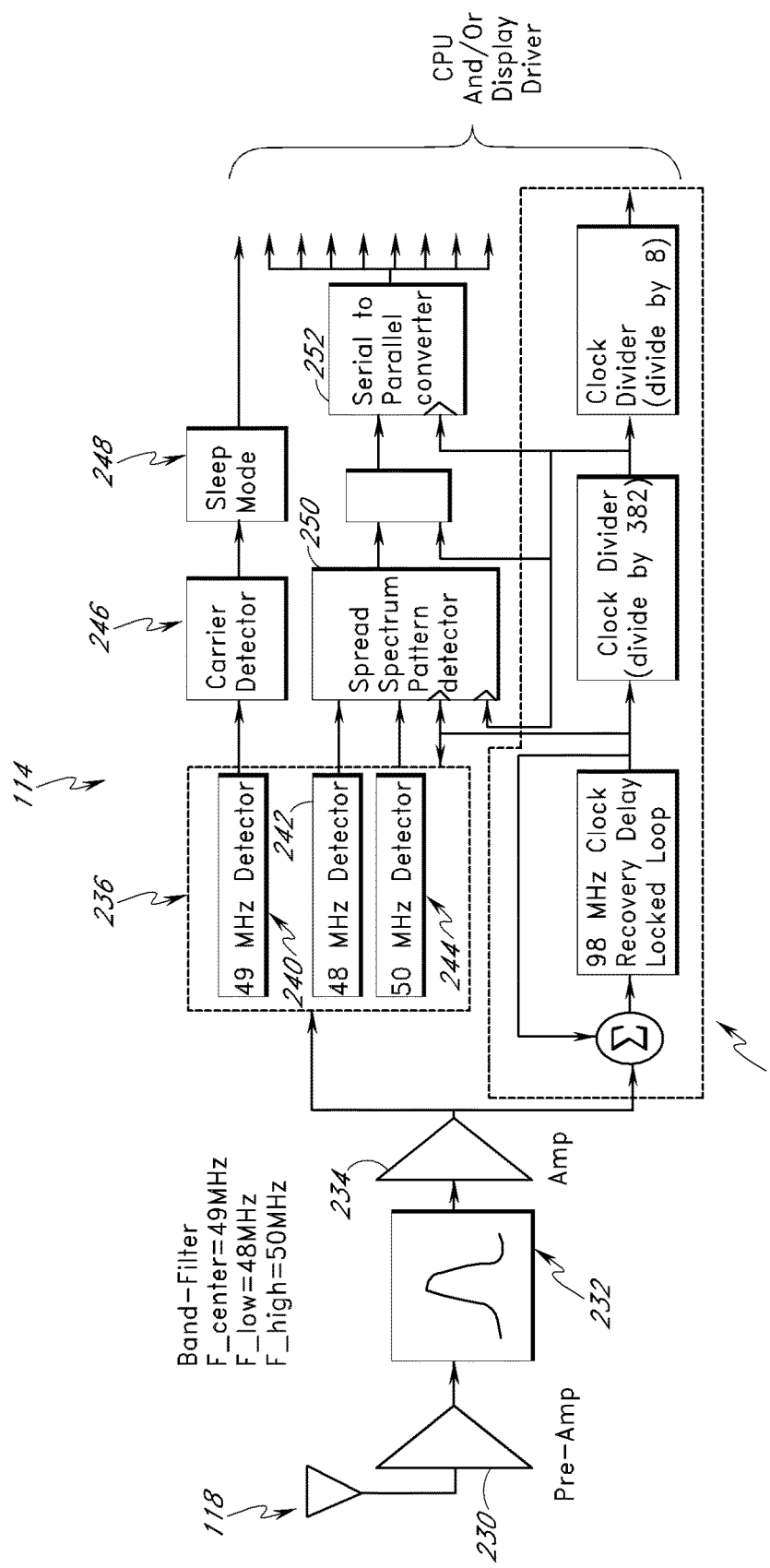
FIG. 11 is a schematic illustration of the transceiver of FIG. 9.

With reference to FIG. 11, a more detailed illustration of the transceiver 114 is illustrated therein. As shown in FIG. 11, the transceiver includes a preamplifier 230, a band pass filter 232, and an amplifier 234 connected in series. The preamplifier 230 and the amplifier 234 can be of any known type, as known to those of ordinary skill in the art. The band filter 232, in the present embodiment, can be constructed as a band pass filter, allowing signals having a frequency from 48 MHz to 50 MHz, inclusive, to pass therethrough. Alternatively, the band filter 232 can include one of three band pass filters configured to allow frequencies centered on 48 MHz, 49 MHz, and 50 MHz, respectively, pass therethrough.

The transceiver 114 also includes a signal detector 236 and a system clock circuit 238. The signal detector 236 includes three signal detectors, e.g., a 49 MHz detector 240, a 48 MHz detector 242 and a 50 MHz detector 244. The 49 MHz detector 240 is connected to a carrier detector 246. As is schematically illustrated in FIG. 11, when the signal detector 236 detects a 49 MHz signal, which corresponds to a state in which no audio signal is being transmitted from the data source 206, the carrier detector 246 causes the transceiver 114 to enter a sleep mode, schematically illustrated by the operation block 248.

As the detectors 242, 244 detect 48 MHz and 50 MHz detectors, respectively, they output signals to a spread spectrum pattern detector 250. The spread spectrum pattern detector outputs a corresponding signal to a serial-to-parallel converter 252. The output of the serial-to-parallel converter 252 is output to a processor 204 (not shown). A "class D" amplifier (not shown), for example, but without limitation, can be connected to the output of the processor 204 to thereby supply a visual signal to the display. It is to be noted that the encoding performed by the encoder and transmitter 208 can be in accordance with any known signal processing techniques, such as, for example, but without limitation, CDMA, TDMA, FDM, FM, FSK, PSK, BPSK, QPSK, M-ARYPSK, MSK, etc. In this embodiment, the transceiver 114 can operate with a single channel.

Figure 12:
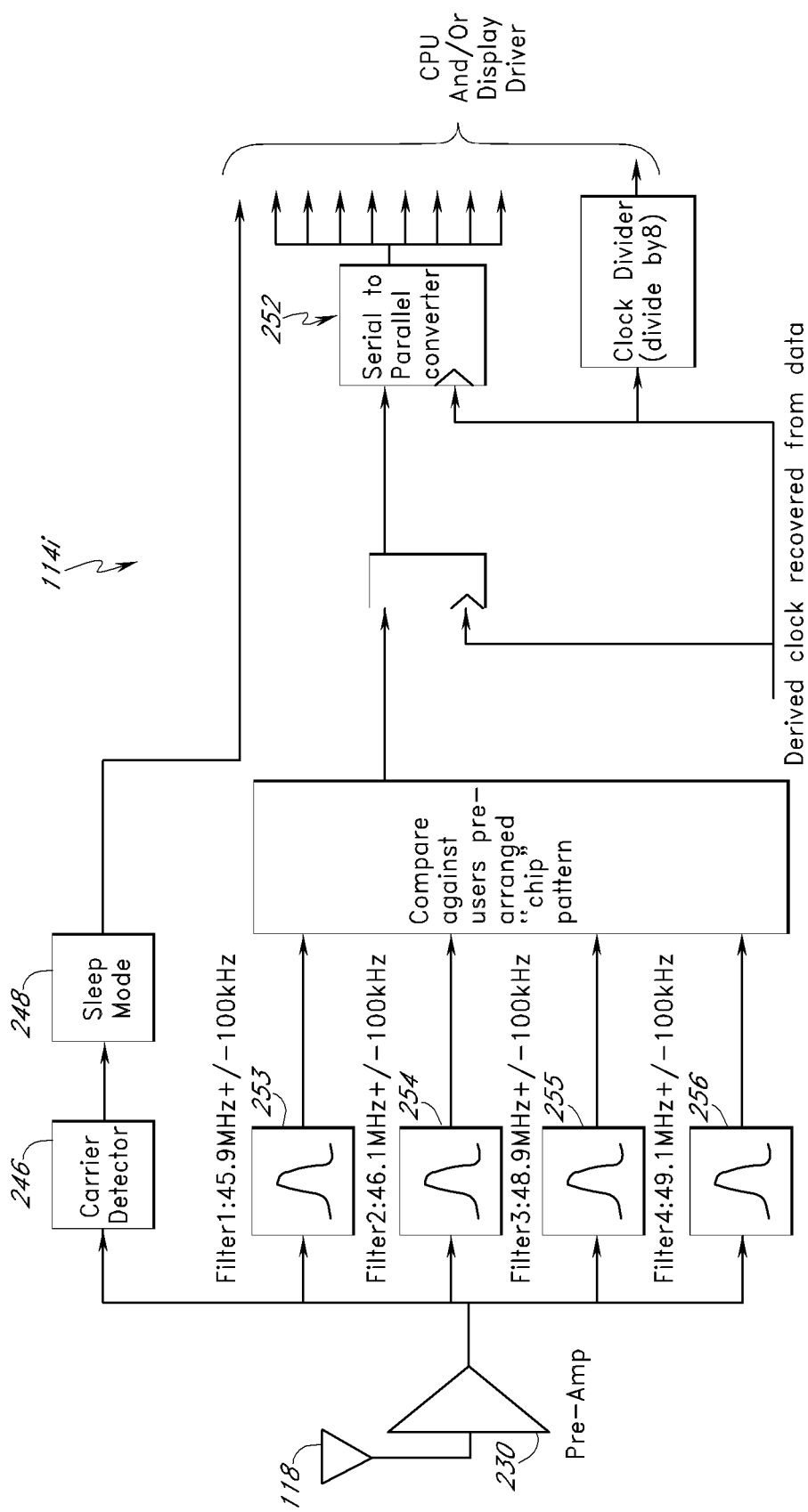
FIG. 12 is a schematic illustration of another embodiment of the transceiver of FIG. 10.

With reference to FIG. 12, a dual channel transceiver 114*i* is schematically illustrated therein. In this modification, the transceiver 114*i* is configured to simultaneously receive two signals, one signal centered on 46 MHz, and a second signal centered on 49 MHz. Thus, the transceiver 114*i* includes four band-pass filters. The first filter 250 is configured to allow a signal at 45.9 MHz plus or minus 100 kHz to pass therethrough. A second filter 252 is configured to allow signals at 46.1 MHz plus or minus 100 kHz to pass therethrough. The third filter 254 is configured to allow signals at 48.9 MHz plus or minus 100 kHz to pass therethrough. A fourth filter 256 is configured to allow signals at 49.1 MHz plus or minus 100 kHz to pass therethrough. As such, the transceiver 114 can receive two simultaneous signals, as noted above, one being centered at 46 MHz and one being centered at 49 MHz. Thus, this modification can be used to receive two signals simultaneously, for example, left and right signals of the stereo audio signal.

Each of the transceivers 114 and 114*i* illustrated in FIGS. 11 and 12 can be configured to receive one pattern 218, a plurality of different signals 218 or only one unique pattern 218. Additionally, as known in the art, the transceivers 114 and 114*i* and the encoder 208 can include pseudo random generators which vary the pattern 218 according to a predetermined sequence. Thus, the receiver and decoder 202 can be configured to auto synchronize by recognizing a portion of the predetermined sequence.

In an application where the transceiver 114 operates according to the BLUETOOTH™ standards, the transceiver 114 communicates with the transmitter according to a spread spectrum protocol so as to establish communication in a short range wireless environment with the minimal risk of interference with other devices. For example, the transceiver 114 can communicate with a BLUETOOTH™ enabled personal computer, or other visual device. The display system can receive the output signal from the BLUETOOTH™ enabled personal computer, and then output the visual signals to the display 31.

In accordance with the BLUETOOTH™ standard, for example, but without limitation, the transceiver 114 can operate in a half duplex mode in which signals are transmitted in only one direction. For example, at any one moment, the transceiver 114 may only either receive signals and direct them to the display 122, or transmit signals, for example, from the display 122 to another device through the antenna 105. Alternatively, the transceiver 114 can be configured to operate in a full duplex mode in which simultaneous of visual signals are received and transmitted to the display 122 and simultaneously other visual signals from the display device are transmitted through the antenna 210 to a cooperating device.

In some embodiments, the display system 10 includes any of the electronic devices and/or assemblies described in U.S. Publication No. 2006/0132382 (filed as U.S. application Ser. No. 11/022,367 on Dec. 22, 2004) and U.S. Pat. No. 7,682,018 (filed as U.S. application Ser. No. 12/331,327 on Dec. 9, 2008), which are expressly incorporated by reference in their entireties. For example, the display system 10 can include any of the digital audio and video systems, mp3 player, GPS system, speakers, and speaker support arms described in either of these documents. Such devices may be carried within the system 10 support or otherwise attached to it.

While the inventions have been illustrated and described with particularity in terms of preferred embodiments, it should be understood that no limitations of the scope of the inventions is intended thereby. Features of any of the foregoing methods and devices may be substituted or added into the others, as will be apparent to those of skill in the art. It should also be understood that variations of the particular embodiments described herein incorporating the principles of the present inventions will occur to those of ordinary skill in the art and yet be within the scope of the present disclosure.

What is claimed is:

1. An eyewear system configured to electronically interface with a source device that is separate from the eyewear system, the eyewear system comprising:
   at least one lens;
   a support configured to support the at least one lens in a wearer's field of view when worn;
   a wireless transceiver configured to communicate with the source device; and
   a user-configurable display supported by the support, the user-configurable display configured to function as a visual interface for the source device;
   wherein the user-configurable display is positioned outside of the wearer's field of view when worn.

2. The eyewear system of claim 1, wherein the user-configurable display comprises an e-paper display.

3. The eyewear system of claim 1, wherein the user-configurable display comprises a bistable display.

4. The eyewear system of claim 1, wherein the user-configurable display comprises an electrochromic display.

5. The eyewear system of claim 1, wherein the user-configurable display is configured to display an image in response to an electrical image signal.

6. The eyewear system of claim 5, wherein the wireless transceiver is configured to receive the electrical image signal.

7. The eyewear system of claim 6, wherein the eyewear system comprises a micro-USB port.

8. The eyewear system of claim 5, wherein the user-configurable display is configured to erase the image from the user-configurable display when electrical energy is delivered to the user-configurable display.

9. The eyewear system of claim 1, wherein the user-configurable display is configured to display an image in response to pressure applied to a surface of the user-configurable display.

10. The eyewear system of claim 9, wherein the user-configurable display is configured to create an impression on the user-configurable display corresponding to at least one of the placement or amount of pressure being applied to the user-configurable display.

11. The eyewear system of claim 1, wherein the user-configurable display is positioned at least partially within a cavity in the support.

12. The eyewear system of claim 1, wherein the user-configurable display is about 1 mm thick.

13. The eyewear system of claim 1, further comprising a brand name or logo displayed on the user-configurable display.

14. The eyewear system of claim 1, wherein the source device comprises a cellular phone.

15. The eyewear system of claim 1, wherein the user-configurable display configured to function as a visual interface for the source device is configured to receive data signals from the source device, and transmit data signals to the source device.

16. The eyewear system of claim 1, wherein the user-configurable display is configured to be operated at least via pressure applied directly to the user-configurable display.

17. The eyewear system of claim 1, wherein the support comprises one or more contacts and the eyewear system further comprises a docking station comprising one or more complementary contacts configured to engage the one or more contacts of the support.

18. The eyewear system of claim 17, wherein the display is configured to display an image in response to coupling the support to the docking station.

19. An eyewear system configured to interface with a source device that is remote from the eyewear system, the eyewear system comprising:
   at least one lens;
   a support configured to support the at least one lens in a user's field of view when worn;
   a wireless transceiver configured to communicate with the source device; and
   a display supported by the support, the display configured to be used as a visual interface for the source device;
   wherein electrical energy used to create a display image on the display is stored outside of the support.

20. An eyewear system configured to electronically interface with a source device separate from the eyewear system, the eyewear system comprising:
   at least one lens;
   a support comprising a lens holder configured to support the at least one lens in a user's field of view when worn and first and second ear stems extending from the lens holder, the first ear stem comprising an inside surface configured to face towards the user's head when worn and an outside surface configured to face away from the user's head when worn;
   a wireless transceiver configured to communicate with the source device; and
   a display supported by the first ear stem, wherein an outside surface of the display is mounted flush with the outside surface of the first ear stem, the display configured to be used as a visual interface for the source device.

21. An eyewear system configured to electronically interface with a source device that is spaced from the eyewear system, the eyewear system comprising:
   an eyewear comprising:
      at least one lens;
      a support configured to support the at least one lens in a wearer's field of view when worn;
      a wireless transceiver configured to communicate with the source device; and
      a user-configurable display supported by the support, the user-configurable display being positioned outside of the wearer's field of view when worn and configured to receive data signals from the source device, and transmit data signals to the source device.

* * * * *